(12) United States Patent
Kim

(10) Patent No.: US 8,175,193 B2
(45) Date of Patent: May 8, 2012

(54) APPARATUS FOR RECOVERING CARRIER WAVE IN DIGITAL BROADCASTING RECEIVER AND METHOD THEREFOR

(75) Inventor: Jae Hyung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1076 days.

(21) Appl. No.: 12/058,292

(22) Filed: Mar. 28, 2008

(65) Prior Publication Data

US 2008/0240295 A1    Oct. 2, 2008

(30) Foreign Application Priority Data

Mar. 29, 2007 (KR) .................. 10-2007-0031151
Mar. 29, 2007 (KR) .................. 10-2007-0031153

(51) Int. Cl.
*H03D 1/24* (2006.01)
*H03C 1/52* (2006.01)
*H04L 27/02* (2006.01)

(52) U.S. Cl. ........ 375/321; 375/270; 375/301; 375/320; 455/202; 455/203; 455/204

(58) Field of Classification Search .................. 375/321
See application file for complete search history.

(56) References Cited

U.S. PATENT DOCUMENTS

2004/0165682 A1 * 8/2004 Jun .................. 375/326
2005/0105651 A1 * 5/2005 Jaffe et al. .......... 375/326

* cited by examiner

*Primary Examiner* — David C. Payne
*Assistant Examiner* — Erin File
(74) *Attorney, Agent, or Firm* — Birch, Stewart, Kolasch & Birch, LLP

(57) ABSTRACT

An apparatus for recovering carrier wave in digital broadcasting receiver and a method therefore are disclosed which are capable of easily detecting and correcting frequency offsets of carrier wave without recourse to a pilot signal in a digital broadcasting receiver receiving a broadcasting signal of vestigial sideband (VSB) modulation system, thereby recovering the carrier wave, wherein, to this end, a complex sine wave whose central frequency is 1/n the symbol frequency is multiplied to generate a real component and imaginary Offset Quadrature Amplitude Modulation (OQAM) signals to calculate a phase error value from the real and imaginary component OQAM signals, to generate a complex sine wave compensating the calculated phase error value, to multiply the complex sine wave by the complex signal outputted from the phase splitter and to convert the complex signal to a baseband signal whose frequency offset is corrected.

24 Claims, 16 Drawing Sheets

APPARATUS FOR RECOVERING CARRIER WAVE IN DIGITAL BROADCASTING RECEIVER AND METHOD THEREFOR

CROSS-REFERENCE TO RELATED APPLICATION

The present application is based on, and claims priority from, Korean Application Numbers 10-2007-0031153 and 10-2007-0031151 filed Mar. 29, 2007, the disclosure of which is incorporated herein by reference in its entirety.

BACKGROUND

The following description relates generally to a system for recovering carrier wave in digital broadcasting receiver, and more particularly to an apparatus for recovering carrier wave in digital broadcasting receiver and a method therefor capable of easily detecting and correcting frequency offsets of carrier wave without recourse to a pilot signal in a digital broadcasting receiver receiving a broadcasting signal of vestigial sideband (VSB) modulation system, thereby recovering the carrier wave.

Generally, a VSB transmission system of a Grand Alliance has been adopted as a standard for a transmission system of digital TV (e.g., SDTV/HDTV) in USA and Korea. The Grand Alliance VSB is a method for modulating one of sidebands generated by amplitude-modulating a signal. That is, in the Grand Alliance VSB, a signal is amplitude-modulated in order to generate two sidebands with a carrier wave as a center, one of sidebands is attenuated and a remained sideband is modulated. That is, the Grand Alliance VSB is one of the methods effectively using a band by obtaining a spectrum of one sideband in a baseband and shifting it to passband.

When a signal is modulated according to VSB, a Direct Current (DC) spectrum of the baseband is shifted to the passband and thus the DC spectrum is changed to a tone spectrum. This signal is commonly called as a pilot signal. A broadcasting station transmits the pilot signal to a receiver with a modulated signal for accurately demodulating the modulated signal at the receiver when a signal is modulated according to the VSB in the broadcasting station.

To be more specific, Annex D of the "ATSC Digital Television Standard" was published by the Advanced Television Systems Committee (ATSC) in September 1995 as its document A/53. This standard defined the broadcasting of digital television (DTV) signals within the United States of America and is referred to in this specification simply as "A/53". A/53 specifies a vestigial-sideband amplitude-modulation signal in which the digital symbols are transmitted by eight-level modulation known as 8 VSB, which has −7, −5, −3, −1, +1, +3, +5 and +7 normalized modulation signal values.

In the VSB system, when a signal is amplitude-modulated, upper and lower sidebands are generated based on a carrier wave. At this point, when one of the two sidebands is greatly reduced, the other sideband is modulated. That is, only one sideband spectrum of a baseband signal is removed to a passband and then transmitted, such that the VSB modulation is more efficient in the use of bandwidth.

In the VSB modulation, if a direct current (DC) spectrum of a baseband signal is removed to a passband, the DC spectrum is converted to a tone spectrum. This signal is called a pilot signal. That is, when a broadcasting station performs the VSB modulation, the pilot signal is carried and transmitted together via air so that a receiver can correctly demodulate the signal.

FIG. 1 is a schematic block diagram of a digital broadcasting receiver receiving and recovering a broadcasting signal of the VSB modulation system.

First of all, an intermediate frequency (IF) signal inputted from an antenna may be converted to an IF passband signal, and the IF passband signal may be converted to an analog signal via an IF process unit 13 and inputted to an analog-to-digital (A/D) converter 15. The IF process unit 13 typically may include a surface acoustic wave (SAW) filter for removing a high frequency component generated by a tuner and interferences of neighboring channels, and an automatic gain control (AGC) circuit for adjusting levels of input signals.

The A/D converter 15 may convert the analog passband signal outputted by the IF process unit 13 to a digital passband signal and output the digital passband signal to a phase splitter 17. For example, when the A/D converter 15 uses an oscillator, the analog signal may be converted to a digital signal having a fixed sampling frequency (25 MHz).

The phase splitter 17 may convert the digitalized passband signal to complex signals (I signal, Q signal), such that the digitalized signal is split to a real component passband signal and an imaginary component passband signal, each signal shifted by a 90-degree, and outputted to a carrier wave recovery unit 19. The carrier recovery unit 19 may convert the passband complex signals outputted from the phase splitter 17 to baseband complex signals and output the converted complex signals to a symbol timing recovery unit 21 for restoring symbol clocks.

The symbol timing recovery unit 21 serves to synchronize clocks of a transmitter terminal and clocks of a receiving terminal, and the symbol timing recovery unit 21 must ultimately operates in such a manner that the baseband signals or passband signals are sampled at an optimal point time-wise to minimize decision errors at an output side of a channel equalizer 27.

An output of the symbol timing recovery unit 21 passes a matched filter 23, where the matched filter 23 employs the square root raised cosine filter having a roll-off component, and an output signal of the matched filter 23 passes a direct current (DC) remover 25, from which a pilot signal is removed and the output signal is inputted to a channel equalizer 27.

The channel equalizer 27 removes the inter-symbol interference (ISI) contained in the signal that has passed the symbol timing recovery unit 21 and is outputted to a phase tracker 29. In other words, in a digital transmitting system, e.g., HDTV, bit detection errors may be generated at a receiving end by a distortion generated by a transmission signal that has passed a multi-pass channel, interference caused by NTSC signals, or a distortion caused by transmission/reception system. Particularly, propagation of signals via the multi-path channel generates ISI among the symbols to be a main cause of detection errors. The channel equalizer 27 removes the ISE among the symbols.

The phase tracker 29 corrects a residual phase of the carrier wave that is not completely removed by the carrier wave recovery unit 19 and outputs the corrected residual phase to a forward error correction unit 31. The forward error correction unit 31 corrects an error of phase-corrected signal and outputs the error to an audio/video (A/V) processor 33. The A/V processor 33 restores to the original signals the video and voice signals compression-processed by Moving Picture Experts Group-2 (MPEG-2) and Dolby AC-3 methods, where the video signal is transmitted to a monitor 37 to allow being viewed, and the voice signal is transmitted to a speaker 39 to allow being heard.

FIG. 2 illustrates exemplary views of the carrier wave recovery unit 19 and the symbol timing recovery unit 21 of FIG. 1.

Referring to FIG. 2, the carrier wave recovery unit 19 includes a Frequency and Phase Locked Loop (FPLL) system that simultaneously performs the frequency acquisition and tracking using pilot signals. Now, a process of recovering the carrier wave using the pilot signal will be described.

First of all, a passband signal is inputted to and passes through the phase splitter 17 in order to obtain a complex signal from the passband signal converted to the digital signal by the A/D converter. In doing so, the complex signal that has passed the phase separator 17 is converted to a baseband signal by the carrier wave recovery unit 19. When a first complex multiplier 19-1 of the carrier wave recovery unit 19 multiplies the passband complex signal that has passed the phase separator 17 by complex conjugate of fp.est, where fp.est is a frequency offset of a pilot signal estimated by fp, where fp is a pilot frequency, the pilot signal comes to be located at a position deviated from zero frequency as much as fp−fp.est, which is a frequency offset (Δfp). At this time, in order to reduce the influence by pattern jitter from the pilot signal having the frequency offset (Δfp), the pilot signal is made to pass the lowpass filter (LPF) 10-2, a carrier wave frequency error and a phase error are extracted by the known frequency/phase error detection means 19-3~19-7 to correct the frequency offset of the basepass outputted from the first complex multiplier 19-1. The real component signal {Re (•)} outputted from the LPF 19-2 is directly inputted to the multiplier 19-4 or via a delayer 19-3, and the imaginary component signal {Imag (•)} is directly inputted to the multiplier 19-4. This type of construction is employed to broaden the frequency restoration scope. For example, a multiplexer (MUX) selects and outputs the real component signal delayed by the delayer 19-3 before the carrier wave frequency is restored, but after the carrier wave is recovered, the multiplexer (MUX) selects and outputs a real component signal that is not delayed.

Successively, the symbol timing recovery unit 21 restores the symbol timing from a signal converted to the baseband via the FPLL which is the carrier wave recovery system.

The symbol timing recovery unit 21 employs a typical Gardner timing error detector (TED), and in order to reduce the influence of pattern jitter by the shift of 8-level VSB symbols, only a bandpass filter 21-2 that takes only the upper sideband as the passband is made to pass, an error necessary for symbol timing restoration is extracted via the Gardner TED. The error thus obtained is lowpass-filtered by a loop filter 21-4 and generates a control signal of a re-sampler 21-1 by passing a numerically controlled oscillator (NCO). The re-sampler 21-1 converts the baseband digital signal sampled by the fixed frequency that was used during the A/D/conversion to a baseband digital signal sampled by a frequency corresponding to a frequency exactly twice the symbol frequency in response to a control signal from the NCO.

The symbol timing restored signal passes the matched filter 23 and is applied to the channel equalizer 27 via the DC remover 25.

In case of the carrier wave restoration system of FIG. 2, the carrier wave recovery entirely relies on the pilot signal, the frequency and the phase thereof, it is impossible to restore or recover the carrier wave, if a frequency corresponding to a position of the pilot signal under a selective frequency channel environment is greatly attenuated.

Furthermore, if a coherence bandwidth of a channel is much narrower than a signal band, the pilot signal is severely attenuated, and the lower sideband signals located about the pilot signal are not frequently attenuated. Under this circumstance, there occurs a problem in which the lower sideband signals operate as pattern jitters to bring forth an overall performance degradation of a receiver.

SUMMARY

An object of the present general novel concept is to provide an apparatus for recovering carrier wave in digital broadcasting receiver and a method therefor in which a pilot signal is not relied on in a digital broadcasting receiver for receiving a signal by the Vestigial Sideband (VSB) modulation method, such that the carrier wave recovery performance is not degraded even under a frequency selective fading channel environment.

Another object is to provide an apparatus for recovering carrier wave in digital broadcasting receiver and a method therefore capable of correcting carrier wave frequency offset using a pilot signal or a baseband complex signal in response to reception signal shape, thereby facilitating restoration of carrier wave of the reception signal under any circumstances.

Still another object is to provide an apparatus for recovering carrier wave in digital broadcasting receiver and a method therefore capable of correcting carrier wave frequency offset using a baseband complex signal without recourse to a pilot signal.

In one general aspect, an apparatus for recovering carrier wave in digital broadcasting receiver comprises: a phase splitter receiving a digitalized passband signal and splitting to mutually phase-different real and imaginary passband complex signals; a down-converter receiving the digitalized passband complex signals outputted from the phase splitter and conjugate complex value relative to complex sine wave value of fixed frequency outputted from a predetermined numerically controlled oscillator (NCO), multiplying the digitalized passband complex signals by the conjugated complex value, and converting the digitalized passband complex signals to near baseband signals; a symbol timing recovery unit sampling the near baseband complex signal outputted from the down-converter twice a symbol frequency, analyzing the sampled signal to detect a timing error, adjusting a sampled time in response to the timing error, and restoring and outputting the symbol timing; and a carrier wave recovery unit receiving a baseband complex signal outputted from the symbol timing recovery unit to detect respective phase errors each having mutually different phase error detection characteristics via a plurality of phase error detection unit, accumulating the detected phase errors to estimate a frequency error relative to the plurality of phase error detection unit, generating a complex sine wave to compensate the frequency error by sharing the estimated frequency error value, and converting the complex signal to frequency offset-corrected baseband signal by multiplying the generated complex sine wave by the complex signal that has passed the symbol timing recovery unit.

Implementations of this aspect may include one or more of the following features. The plurality of phase error detection unit in the carrier wave recovery unit comprises: a first phase error detection unit detecting a phase error by detecting a pilot signal of complex signal that is inputted; and a second phase error detection unit detecting a phase error by using an inputted complex signal shape.

The carrier wave recovery unit comprises: mutually parallel-connected first and second complex multiplier each correcting frequency offset relative to baseband complex signal by multiplying baseband complex signal that has passed the down-converter by complex sine wave corresponding to the estimated frequency error value; a first phase error detection unit detecting a phase error by detecting a pilot signal of complex signal outputted from the first complex multiplier; a second phase error detection unit detecting a phase error by using the complex signal shape outputted from the second complex multiplier; a frequency sharing loop filter accumulating the phase error value outputted from the first and second phase error detection unit to estimate the frequency error, converting the phase error to a frequency error by sharing the estimated frequency error value and adding the phase error, and allowing the frequency error value to be supplied to the first and second complex multiplier via the numerical control oscillator; and a controller monitoring the complex signal inputted from the first and second complex multiplier to differentially control a sharing contribution relative to the phase error of the first and second phase error detection units inputted from the frequency sharing loop filter, and selectively controlling the output of the complex signal inputted from the first and second complex multipliers.

The first phase error detection unit comprises: a lowpass filter receiving a complex signal outputted from a first complex multiplier to extract a pilot signal; a delayer receiving a real component pilot signal outputted from the lowpass filter and delaying the real component pilot signal; a multiplexer receiving the real component pilot signal from the delayer or the lowpass filter and selectively outputting the real component pilot signal; and a multiplier receiving the imaginary component pilot signal outputted from the lowpass filter and the real component signal outputted from the multiplexer and multiplying the imaginary component pilot signal outputted from the lowpass filter by the real component signal outputted from the multiplexer to detect a phase error value, and outputting the detected phase error value to the frequency sharing loop filter.

The second phase error detection unit comprises: a down-sampler sampling the baseband complex signal outputted from the second complex multiplier by a frequency equal to a symbol frequency; an Offset Quadrature Amplitude Modulation (OQAM) signal generator receiving the complex signal outputted from the down-sampler and a complex sine wave whose central frequency is 1/n the symbol frequency from outside, and multiplying the complex signal outputted from the down-sampler by the complex sine wave whose central frequency is 1/n the symbol frequency, splitting the complex signal to real component and imaginary component OQAM signals and outputting the real component and imaginary component OQAM signals; and a phase error calculation unit calculating a phase error value from the real component and imaginary component OQAM signals outputted from the OQAM signal generator to extract a phase error value.

The 1/n complex sine wave of the OQAM signal generator is a fixed oscillation signal whose central frequency is ¼ the symbol frequency, and the phase error calculation unit receives the real component $\{I(k)\}$ and imaginary component $\{Q(k)\}$ OQAM signals outputted from the OQAM signal generator to calculate a phase error value and outputs $\tan h\{I(k)*Q(k)\} - \tan h\{Q(k-½)*I(k-½)\}$ as the phase error value.

The frequency sharing loop filter comprises: a first Kp multiplier multiplying the phase error value of the first phase error detection unit by a proportional gain control signal outputted from the controller; a second Kp multiplier multiplying the phase error value of the second phase error detection unit by the proportional gain control signal outputted from the controller; a first Ki multiplier multiplying the phase error value of the first phase error detection unit by an accumulated gain control signal outputted from the controller; a second Ki multiplier multiplying the phase error value of the second phase error detection unit by an accumulated gain control signal outputted from the controller; an accumulator calculating a frequency error value of the carrier wave by adding outputs from the first and second Ki multipliers to calculate a frequency error value of the carrier wave; a first adder converting the phase error to a frequency error value by adding the phase error value outputted from the first Kp multiplier and the frequency error value outputted from the accumulator; and a second adder converting a phase error to a frequency error value by adding the phase error value outputted from the second Kp multiplier and the frequency error value outputted from the accumulator.

The symbol timing recovery unit comprises: a re-sampler sampling the baseband signal outputted from the carrier wave recovery unit by a clock frequency twice a predetermined symbol frequency at a transmission terminal and outputting the sampled baseband signal; a passband timing error detection unit detecting a timing synchronization error by extracting an upper sideband signal from the signal spectrum generated from the re-sampler to monitor a zero crossing status; a loop filter performing a lowpass filtering by receiving the timing error signal outputted from the passband timing error detection unit; and a numerically controlled oscillator (NCO) generating a sampling clock that is error-timing compensated by the signal outputted from the loop filter and supplying the sampling clock to the re-sampler.

In another general aspect, an apparatus for recovering carrier wave in digital broadcasting receiver comprises: a phase splitter receiving a digitally converted passband signal and split the digitally converted passband signal to mutually phase-different real component and imaginary component passband complex signals (I signal, Q signal) and outputting; a down-sampler sampling the baseband complex signal outputted from the phase splitter by a frequency that is equal to the symbol frequency and outputting; and a carrier wave recovery unit multiplying the received complex signal outputted from the down-sampler by a complex sine wave whose central frequency is ¼ the symbol frequency to generate real component and imaginary component OQAM signals and to calculate a phase error value from the real and imaginary component OQAM signals, generating a complex sine wave that compensates the calculated phase error value, multiplying the complex sine wave by the complex signal outputted from the phase splitter and converting the complex signal to frequency offset-compensated baseband signal.

Implementations of this aspect may include one or more of the following features.

The apparatus for recovering carrier wave in digital broadcasting receiver may further comprise a symbol timing recovery unit disposed between the phase splitter and the down-sampler for sampling the complex signal outputted from the phase splitter twice the symbol frequency, detecting a timing error by analyzing the sampled signal and adjusting a sampling time in response to the timing error to synchronize the symbol frequency and the timing.

The apparatus for recovering carrier wave in digital broadcasting receiver may further comprise a matched filter disposed between the symbol timing recovery unit and the down-sampler for removing an aliasing of the baseband complex signal outputted from the symbol timing recovery unit.

To be more specific, the symbol timing recovery unit comprises: a re-sampler sampling the baseband signal outputted from the carrier wave recovery unit by a clock frequency twice a predetermined symbol frequency at a transmission terminal and outputting the sampled baseband signal; a passband timing error detection unit detecting a timing synchronization error by extracting an upper sideband signal from the signal spectrum generated from the resampler to monitor a zero crossing status; a loop filter performing a lowpass filtering by receiving the timing error signal outputted from the passband timing error detection unit; and a numerically controlled oscillator (NCO) generating a sampling clock that is error-timing compensated by the signal outputted from the loop filter and supplying the sampling clock to the re-sampler.

The carrier wave recovery unit comprises: an OQAM signal generator multiplying the complex signal outputted from the down-sampler by a complex sine wave whose central frequency is ¼ the symbol frequency that is provided from outside to split the complex signal to a real component and an imaginary component and outputting the split complex signal; a phase error detection unit calculating a phase error value from the real and imaginary component OQAM signals outputted from the OQAM signal generator and outputting; a second down-sampler extracting a phase error value corresponding to the frequency offset outputted from the phase error detection unit using a frequency ½ the sampling frequency (fs); an up-sampler sampling with an increased clock speed a baseband phase error inputted from the second down-sampler with a symbol frequency speed in order to match an operation frequency with a portion compensating a baseband phase; a loop filter lowpass-filtering a baseband phase error outputted from the up-sampler; an adder adding an output signal (Δfp) of the loop filter to a predetermined pilot frequency (fp) to output an estimated carrier wave frequency offset signal; a numerically controlled oscillator (NCO) receiving a direct current signal relative to the carrier wave frequency offset estimated by the adder to generate a complex sine wave having a frequency of an estimated carrier wave frequency offset; and a complex multiplier disposed between the phase splitter and the symbol timing recovery unit for multiplying a conjugated complex value of the complex sine wave outputted from the NCO by a complex signal outputted from the phase splitter to correct the frequency offset and convert the complex signal outputted from the phase splitter to a baseband signal.

In still another general aspect, an apparatus for recovering carrier wave in digital broadcasting receiver comprises: a phase splitter receiving a digitally converted passband signal and split the digitally converted passband signal to mutually phase-different real component and imaginary component passband complex signals (I signal, Q signal) and outputting; a down converter converting a digitalized passband signal outputted from the phase splitter to a baseband signal; a symbol timing recovery unit sampling the complex signal outputted from the down converter twice the symbol frequency, analyzing the sampled signal to detect a timing error and adjusting a sampled time relative to the timing error to time synchronize the symbol frequency; a down sampler sampling the complex signal outputted from the symbol timing recovery unit in the same frequency as that of the symbol frequency and outputting; and a carrier wave recovery unit receiving the complex signal outputted from the down sampler, multiplying the complex signal by a complex sine wave whose central frequency is ¼ the symbol frequency to generate a real component and imaginary component OQAM signals and to calculate a phase error value from the real component and imaginary OQAM signals, and to generate a complex sine wave compensating the calculated phase error value, and multiplying the complex sine wave by the complex signal outputted from the symbol timing recovery unit to correct the frequency offset of the complex signal.

The apparatus may further include a matched filter disposed between the symbol timing recovery unit and the down sampler to remove an aliasing of the baseband complex signal outputted via the symbol timing recovery unit and outputting.

In another general aspect, a method for recovering carrier wave in digital broadcasting receiver comprises: converting a digitally converted passband complex signal to a baseband complex signal; receiving the baseband complex signal to sample in the same frequency as that of the symbol frequency and outputting; multiplying the complex signal sampled in the same frequency as that of the symbol frequency by a complex sine signal ¼ frequency of the symbol frequency to generate real and imaginary component OQAM complex signal; and calculating and obtaining a phase error value from the OQAM complex signal to estimate a frequency offset relative to the phase error value, and generating a complex sine wave corresponding to the estimated frequency offset to correct the frequency offset of the baseband complex signal.

To be more specific, the baseband complex signal is a signal in which a timing error of the symbol frequency is recovered.

The step of correcting the frequency offset comprises: calculating a phase error value from the OQAM complex signal and outputting the phase error value; extracting the outputted phase error value by ½ frequency of a sampling frequency (fs); sampling by increasing a clock speed in order to match an operation frequency with a portion compensating a baseband phase; low-pass filtering the up-sampled phase error; receiving a direct current signal relative to the phase error to generate a complex sine wave having a frequency of estimated carrier wave frequency offset; and multiplying a conjugate complex value of the generated complex sine wave by the baseband complex signal to correct the frequency offset.

DETAILED DESCRIPTION

A detailed description of one or more implementations of the present inventive concept is provided below along with accompanying figures that illustrate the principles of the concept. The concept is described in connection with such implementations, but the concept is not limited to any implementation. The scope of the concept is limited only by the claims and the concept encompasses numerous alternatives, modifications and equivalents. Numerous specific details are set forth in the following description in order to provide a thorough understanding of the concept. These details are provided for the purpose of example and the concept may be practiced according to the claims without some or all of these specific details. For the purpose of clarity, technical material that is known in the technical fields related to the concept has not been described in detail so that the concept is not unnecessarily obscured.

In this application, the use of the singular includes the plural unless specifically stated otherwise. In this application, the use of "or" defines "and/or" unless stated otherwise. Furthermore, the use of the term "including", as well as other forms, such as "includes" and "included", is not limiting. Wherever possible, the same reference numbers will be used throughout the drawings to refer to the same or like parts.

Figure 1:
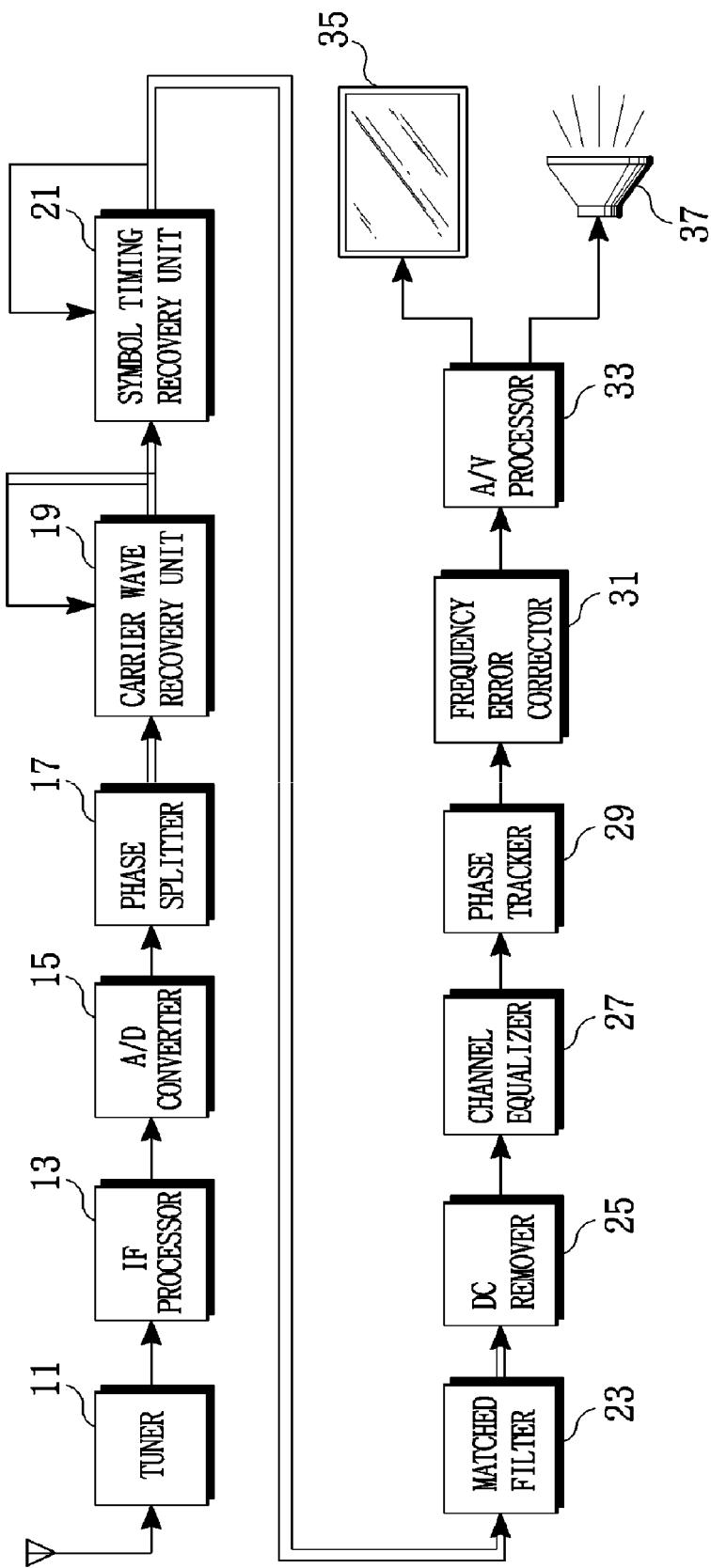
FIG. 1 is a block diagram illustrating a carrier wave recovery unit of a digital broadcasting receiver according to prior art.
Figure 2:
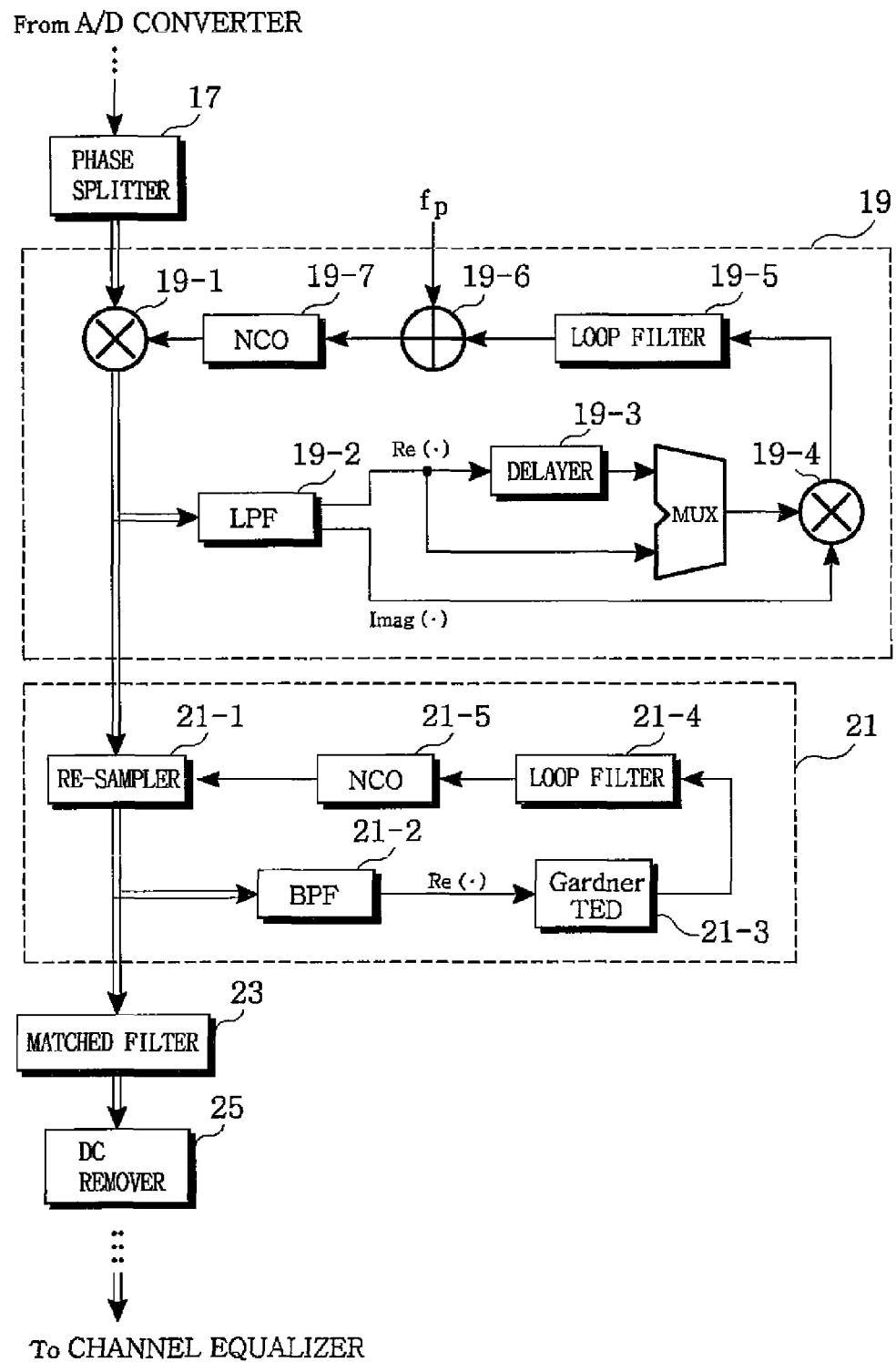
FIG. 2 is a block diagram illustrating a detailed construction of a carrier wave recovery unit of FIG. 1 and a symbol timing recovery unit.
Figure 3:
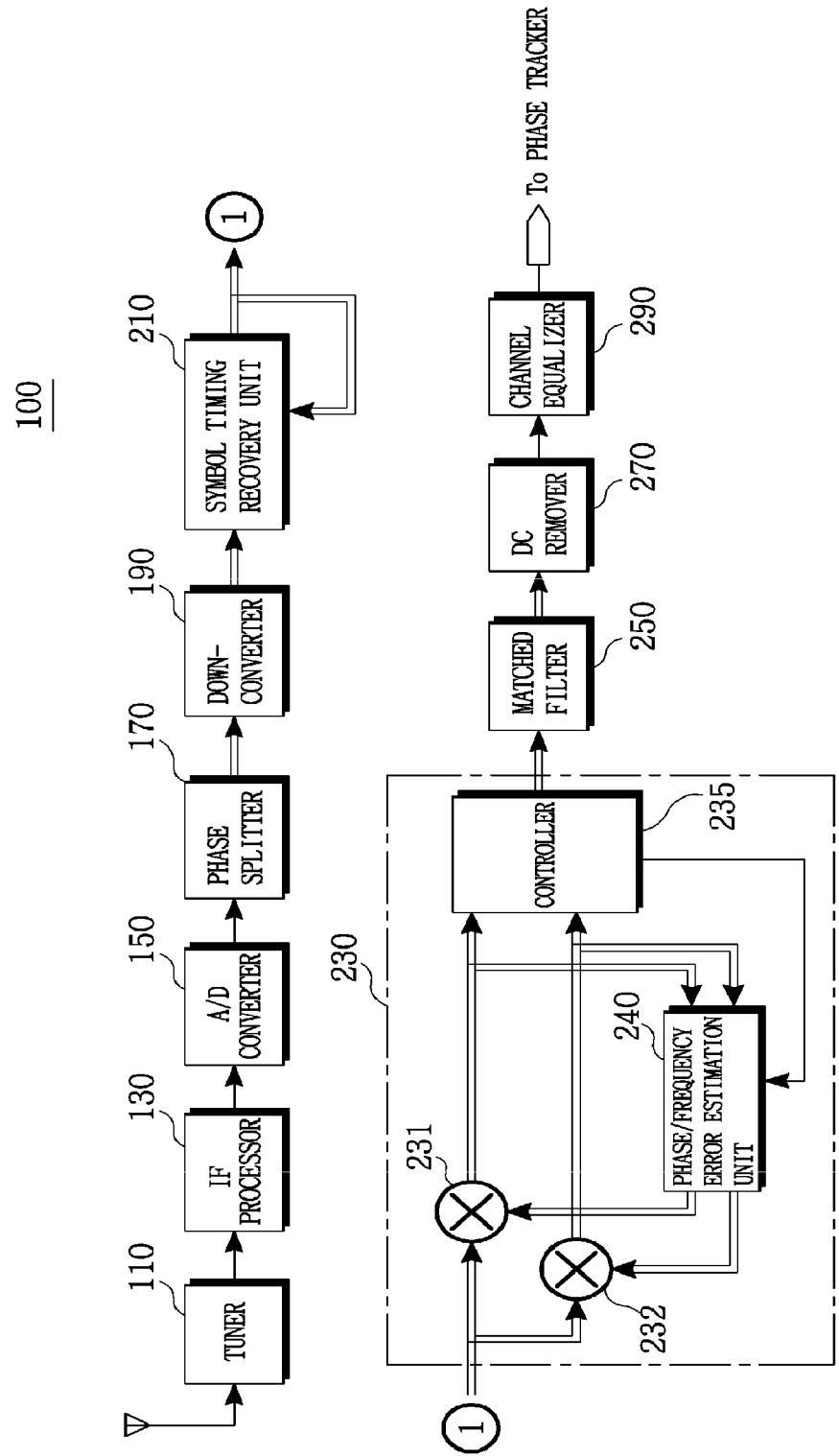
FIG. 3 shows an exemplary implementation of a carrier wave recovery unit of a digital broadcasting receiver.

FIG. 3 is a block diagram illustrating a carrier wave recovery unit of a digital broadcasting receiver according to an exemplary implementation. The carrier wave recovery unit includes a tuner 10, an intermediate frequency (IF) processor 130, an analog-to-digital (A/D) converter 150, a phase splitter 170, a down converter 190, a symbol timing recovery unit 210, a carrier wave recovery unit 230, a matched filter 250 and a direct current (DC) remover 270.

The tuner 110 receives a terrestrial wave radio frequency signal inputted from an antenna to convert it to an intermediate frequency passband signal.

The IF processor 130 receives the passband signal outputted from the tuner 110 and converts to an analog signal to output to the A/D converter 150. The IF processor 130 includes a surface acoustic wave (SAW) filter for removing an adjacent channel interference and a high frequency component generated from the tuner 110, and an automatic gain control (AGC) circuit for controlling an inputted signal level.

The A/C converter 150 receives an analog passband signal outputted from the IF processor 130 to sample using a fixed sampling frequency and converting to a digitalized passband signal via quantization for output to the phase splitter 170.

The phase splitter 170 receives the digitalized passband signal from the A/D converter 150 to be converted to complex signals (I signal, Q signal) and outputs where the digitalized signal is split to a real component passband signal and an imaginary component passband signal, each signal shifted by a 90-degree, and outputted to a down converter 190. For convenience sake, the real component signal outputted from the phase splitter 170 is called I signal and the imaginary component signal is called Q signal.

The down converter 190 multiplies the digitalized passband signal outputted from the phase splitter 170 by a conjugate complex value relative to a complex sine wave of a fixed frequency and converts the digitalized passband signal to near baseband signal. The near baseband defines a state where a digitalized passband signal is multiplied by a pilot frequency (fp) which is a fixed frequency to be converted near to a baseband signal. The near baseband also defines a state where the carrier wave is not completely restored.

The symbol timing recovery unit 210 samples the near baseband complex signal outputted from the down converter 190 twice the symbol frequency, analyzes the sampled signal to detect a timing error, and adjusts a sampling time in response to the timing error to restore the timing of the symbol frequency.

The carrier wave recovery unit 230 receives the baseband complex signal outputted from the symbol timing recovery unit 210 to detect respective phase errors via a phase/frequency error estimating unit 240 that includes a plurality of phase error detection units, each having mutually different phase error detection characteristic, to accumulate the detected phase errors and to estimate frequency errors relative to the plurality of phase error detection units, shares the estimated frequency error values to generate complex sine waves that compensate the frequency errors, and converts the complex signal to a baseband signal corrected in the frequency offset by multiplying the generated complex sine waves by the complex signal that has passed the symbol timing recovery unit 210.

The carrier wave recovery unit 230 includes first and second complex multipliers 231, 232, a phase/frequency error estimating unit 240 and a controller 235, where the first and second complex multipliers 231, 232 multiply the baseband complex signal that has passed the symbol timing recovery unit 210 by a complex sine wave corresponding to the estimated frequency error value to thereby correct a frequency offset relative to the baseband complex signal. The phase/frequency error estimating unit 240 receives the baseband complex signal outputted from the first and second complex multipliers 231, 232 to detect respective phase errors via a detection unit having mutually different inherent phase error detection characteristic and to estimate a frequency error value in response to the phase error, and outputs a signal compensating the estimated frequency error value to the first and second complex multipliers 231, 232, where a pilot signal is converted to a baseband signal located at a zero frequency point (f=0).

The controller 235 monitors the complex signal inputted from the first and second complex multipliers 231, 232 to differentially control a sharing contribution relative to the phase and frequency error of the phase/frequency error estimating unit 240 and selectively controls the output of the complex signal inputted from the first and second complex multipliers 231, 232 and outputs to the matched filter 250 side.

The matched filter 250 is a fixed coefficient I, Q digital matched filter having the same roll-off value about 6 MHz as that of a complex square root raised cosine filter used in the transmitter. Accordingly, the matched filter removes an aliasing from the baseband complex signal outputted from the carrier wave recovery unit 230 and outputs the aliasing-removed signal.

The DC remover 270 removes a pilot signal so inserted as to facilitate the carrier wave restoration and outputs to a channel equalizer for removing the inter-symbol interference (ISI).

Figure 4:
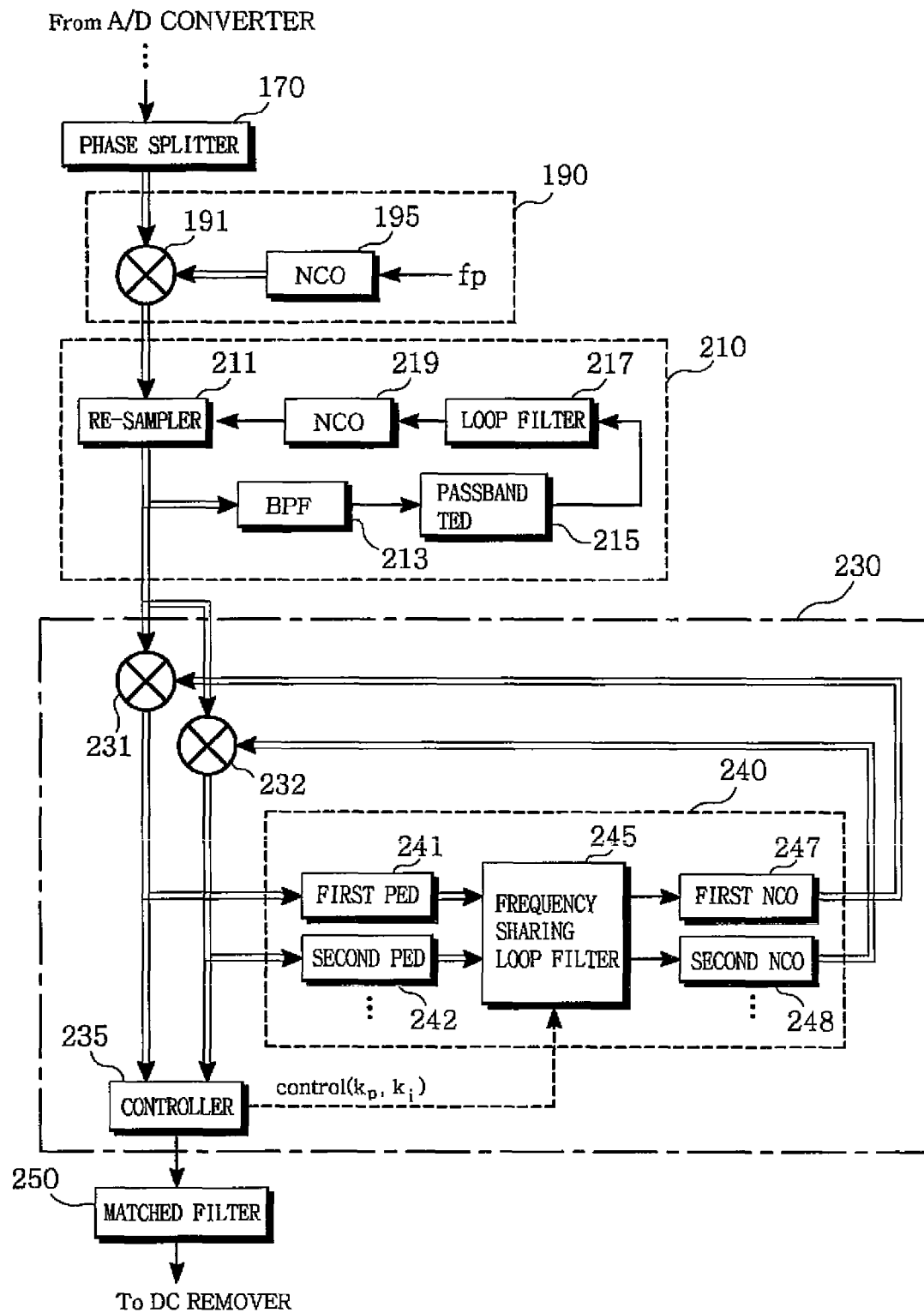
FIG. 4 shows an exemplary implementation of a symbol timing recovery unit and a carrier wave recovery unit of FIG. 3.

FIG. 4 is a block diagram illustrating a detailed construction of a down converter, a symbol timing recovery unit and a carrier wave recovery unit of FIG. 3, where a carrier wave is restored by employing a frequency and phase locked loop (FPLL) system to restore the timing and phase errors of the carrier wave.

The down converter 190 receives the digitalized passband signal outputted from the phase splitter 170 and a conjugated complex value relative to the complex sine wave of the fixed frequency outputted from a numerically controlled oscillator (NCO. 195), multiplies via a complex multiplier 191 to convert the digitalized passband signal to near baseband signal.

The symbol timing recovery unit 210 includes a FPLL system including a re-sampler 211, a passband timing error detection unit 213 and a numerically controlled oscillator (NCO. 217). In other words, the symbol timing recovery unit 210 receives a signal converted to a baseband signal by the down converter 190 to sample a baseband signal precisely twice the frequency (2 $f_{s,vsb}$) of the symbol frequency via a predetermined FPLL system comprising the re-sampler 211, the passband timing error detection unit 213, a loop filter 215 and the NCO 217, analyzes the sampled signal to detect a timing error and to adjust the sampled time in response to the timing error and synchronizes the symbol timing. The baseband signal whose frequency offset is not corrected corresponds to a passband signal, such that the passband timing error detection unit 213 must be used to enable the frequency band of the symbol to be adjusted to a predetermined 5.38 MHz.

The carrier wave recovery unit 230 receives the baseband complex signal outputted from the symbol timing recovery unit 210 to respectively detect phase errors through a plurality of phase error detection units 241, 242 each having mutually different phase error detection characteristic, accumulates the detected phase errors to estimate frequency errors relative to the plurality of phase error detection units, shares the estimated frequency error value to generate a complex sine wave that compensates the frequency error, and multiplies the generated complex sine signal by the complex signal that has passed the symbol timing recovery unit 210 to allow the complex signal to be converted to a baseband signal whose frequency offset is corrected.

The carrier wave recovery unit 230 comprises a FPLL system that includes a first complex multiplier 231, a second complex multiplier 232, a controller 235 and a phase/frequency error estimating unit 240.

The phase/frequency error estimation unit 240 includes a first phase error detection unit 241 detecting a pilot signal of the complex signal outputted from the first complex multiplier 231 to detect a phase error, a second phase error detection unit 242 detecting a phase error by using a complex signal shape outputted from the second complex multiplier 232, a frequency sharing loop filter 245 accumulating phase error values outputted from the first and second phase error detection units 241, 242 to estimate the frequency errors, sharing the estimated frequency error values to add the phase errors and to convert the phase errors to frequency errors and to allow the frequency error values to be supplied to the first and second complex multipliers 231, 232 via a numerically controlled oscillator (NCO), a first NCO 247 receiving a frequency error value related to the first phase error detection unit 241 outputted from the frequency sharing loop filter 245 to generate a complex sine signal corresponding to the frequency error value and output to the first complex multiplier 231, and a second NCO 248 receiving a frequency error value related to the second phase error detection unit 242 outputted from the frequency sharing loop filter 245 to generate a complex sine signal corresponding to the frequency error value and output to the second complex multiplier 232.

In other words, the output signal from the symbol timing recovery unit 210 passes the first and second complex multiplier 231, 232 and is multiplied by the complex sine wave having the estimated frequency/phase outputted from the first and second NCOs 247, 248 to respectively correct the phases and frequencies of the carrier wave.

The first and second phase error detection units 241, 242 for restoring the carrier wave receive the complex signals outputted from the first and second complex multiplier 231, 232 to detect the phase errors, where the first and second phase error detection units 241, 242 have respectively different phase error detection characteristics.

For example, the first phase error detection unit 241 uses a pilot signal to detect the phase errors, but the second phase error detection unit 242 uses a complex signal shape (not using the pilot signal) to detect the phase errors. As a result, even if the pilot signal included in the carrier wave is severely attenuated, the carrier wave may be restored by using the second phase error detection unit 242.

Now, detailed construction of the first and second phase error detection unit 241, 242 having the above-mentioned characteristics will be described with reference to FIGS. 5 and 6.

Figure 5:
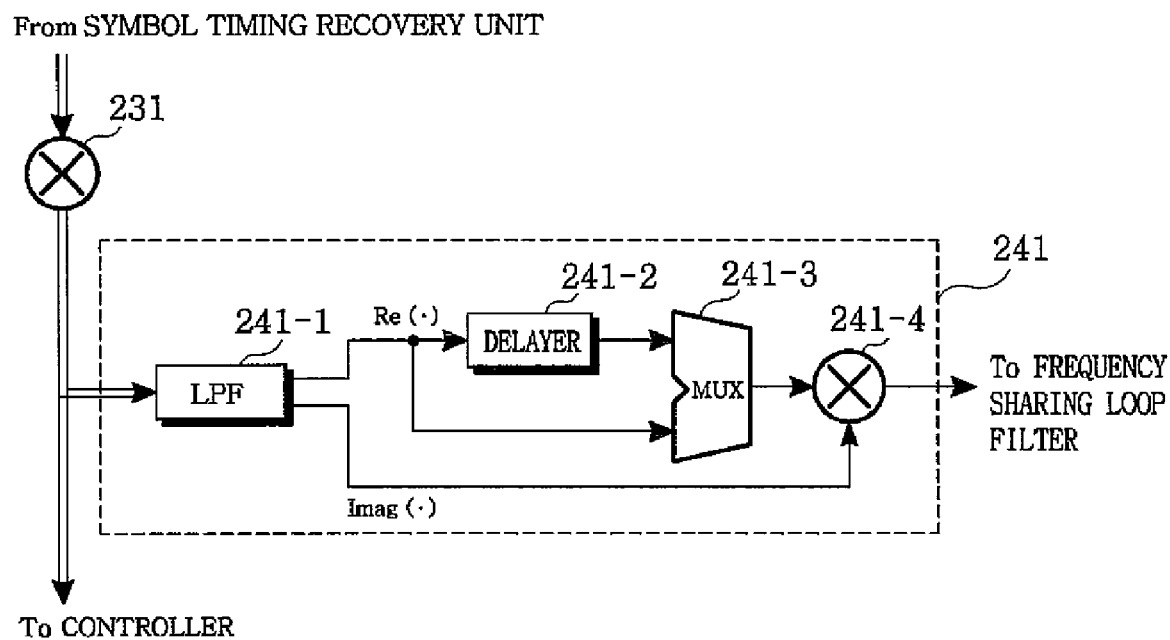
FIG. 5 is a block diagram illustrating a detailed construction of a first phase error detection unit of FIG. 4.

Referring to FIG. 5, the first phase error detection unit 241 includes a lowpass filter 241-1, a delayer 241-2, a multiplexer 241-3 and a multiplier 241-4.

The lowpass filter 241-1 receives a complex signal outputted from the first complex multiplier 231 to extract a pilot signal, the delayer 241-2 receives a real component {Re (•)} pilot signal outputted from the lowpass filter 241-1 and delays the real component pilot signal, the multiplexer 241-3 receives the real component pilot signal from the delayer 241-2 or from the lowpass filter 241-1 and selectively outputs, and the multiplier 241-4 respectively receives an imaginary component signal {Imag (•)} outputted from the lowpass filter 241-1 and the real component {Re (•)} pilot signal outputted from the multiplexer 241-3, multiplies to detect the phase error value, and outputs the detected phase error value to the frequency sharing loop filter 245.

In other words, the pilot signal is extracted by passing the complex signal outputted from the first complex multiplier 231 through the lowpass filter (LPF. 241-1), the real component {Re (•)} pilot signal outputted from the lowpass filter 241-1 is directly inputted or via the delayer 241-2 to the multiplexer (MUX. 241-3), and the output signal of the multiplexer 241-3 and the imaginary component signal {Imag (•)} outputted from the lowpass filter 241-1 are inputted to the multiplier 241-4 for multiplication. The construction thus described is intended to broaden a restoration scope of the frequency. For example, although the multiplexer 241-3 selectively outputs real component signal delayed by the delayer 241-2 before the carrier wave is restored, the multiplexer 241-3 selectively outputs the non-delayed real component signal once the carrier wave is restored.

Figure 6:
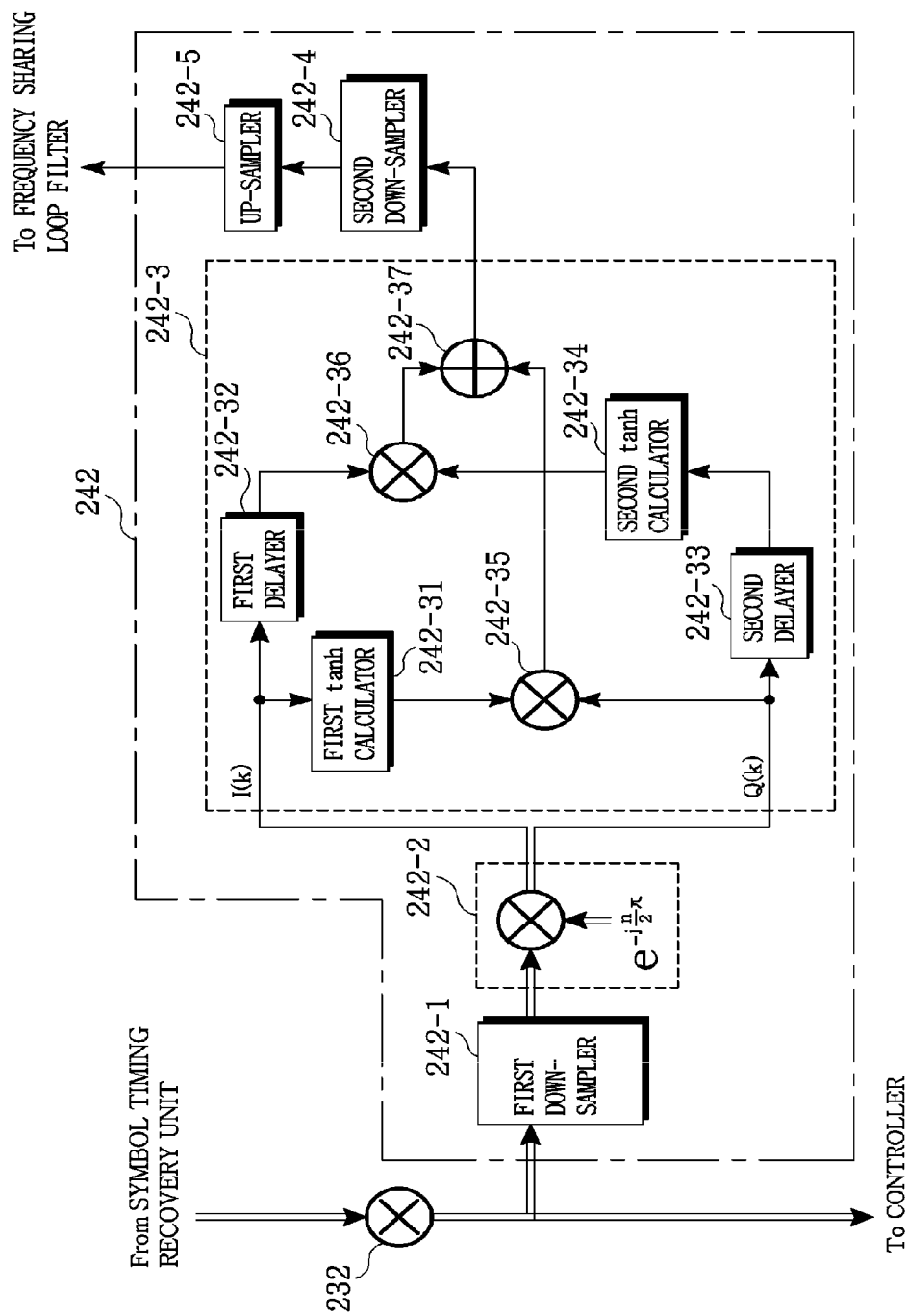
FIG. 6 is a block diagram illustrating a detailed construction of a second phase error detection unit of FIG. 4.

Meanwhile, referring to FIG. 6, the second phase error detection unit 242 includes a first down sampler 242-1, an Offset Quadrature Amplitude Modulation (OQAM) signal generator 242-2, a phase error calculation unit 242-3, a second down sampler 242-4 and an up-sampler 242-5.

The first down sampler 242-1 samples the baseband complex signal outputted from the second complex multiplier 232 using 1 fs which is the same frequency as the symbol frequency and outputs to the OQAM signal generator 242-2. The OQAM signal generator 242-2 includes a complex multiplier which receives the complex signal outputted from the first down sampler 242-1 and a complex sine wave ($e^{-j(n/2)\pi}$) whose central frequency is ¼ the symbol frequency, multiplies, and outputs by splitting the complex signal to a real component and an imaginary component. The real and imaginary component complex signals outputted from the OQAM signal generator 242-2 are inputted to the phase error calculation unit 242-3.

The phase error calculation unit 242-3 includes a first tan h calculator 242-31, a first delayer 242-32, a second delayer 242-33, a second tan h calculator 242-34, a first multiplier 242-35, a second multiplier 242-36 and an adder 242-37. Meanwhile, the restoration of carrier wave of the phase error calculation unit 242-3 is done by estimating a phase of the baseband from a reception signal mixed with noise with no consideration to the pilot signal, such that restoration of the carrier wave in the present novel concept is not affected by attenuation of the pilot signal.

As noted in the above, in order to apply the VSB method for restoration of carrier wave without recourse to the pilot signal, correlation between the VSB signal and offset quadrature amplitude modulation (OQAM) signal was utilized. The equivalence of the VSB signal and OQAM signal is well known in the art, so there will no further explanation thereto.

The carrier wave restoration algorithm induced by treating a VSB signal as OQAM may be applied to the VSB method based on the equivalence, and in implementations of the present novel concept, OQAM method is applied to the restoration of carrier wave to allow the carrier wave to be recovered without the assistance of pilot signal.

Now, operation of detailed construction of the phase error calculation unit 242-3 will be described.

First, the first tan h calculator 242-31 calculates a tan h $\{I(k)\}$ by input of the real signal $\{I(k)\}$ and the tan h $\{I(k)\}$ is outputted, and the first delayer 242-32 is delayed by input of I (k) signal to generate I (k−½) signal. The second delayer 242-33 is delayed by input of the imaginary signal $\{Q(k)\}$ to generate a Q (k−½) signal, and the second tan h calculator 242-34 receives the Q (k−½) signal to calculates tan h $\{Q(k-½)\}$ and outputs.

The first multiplier 242-35 calculates tan h $\{I(k)*Q(k)\}$ value from outputs of the first tan h calculator 242-31 and the imaginary signal and outputs, and the second multiplier 242-36 calculates tan h $\{Q(k-½)*I(k-½)\}$ value from outputs of the second tan h calculator 242-34 and the first delayer 242-32 and outputs.

Lastly, when an output signal from the second multiplier 242-36 passes through the adder 242-37, tan h $\{I(k)*Q(k)\}$− tan h $\{Q(k-½)*I(k-½)\}$ value may be obtained, which is the phase error value obtained by the OQAM method.

The carrier wave restoration by the OQAM method is based on restoration of symbol timing in terms of algorithm characteristics, such that the phase error calculation unit 242-3 of the carrier wave recovery unit 230 is located at the rear end of the symbol timing recovery unit 210 as shown in FIG. 4. In other words, the symbol timing recovery unit 210 must be applied with passband symbol timing restoration algorithm capable of restoring the symbol timing even under a circumstance where the carrier wave frequency offset is available in order to facilitate a smooth operation of synchronizer, and must be able to extract the baseband phase error based on the restored symbol clock.

The phase error calculation unit 242-3 extracts only the symbol unit baseband phase error value out of phase error values by the sampling frequency of ½ fs (i.e., 5.38 MHz) in the rear end of the second down sampler 242-4 because the phase error calculation unit 242-3 operates in over-sampled time domain. To be more specific, the second down sampler 242-4 extracts by ½ fs sampling frequency the phase error value corresponding to the frequency offset outputted from the phase error calculation unit 242-3 and outputs the phase error value to the up sampler 242-5, where the up sampler 242-5 up-samples by a clock speed (2 fs) at the second complex multiplier 232 the baseband phase error inputted at 1 fs,$_{OQAM}$ (5.38 MHz) speed, in order to match the operational frequency of a portion compensating the baseband phase, and outputs the baseband phase error to the frequency sharing loop filter 245.

The carrier wave phase error values respectively estimated by the first and second phase error detection units 241, 242 are inputted to the frequency sharing loop filter 245, where the frequency sharing loop filter 245 accumulates the phase error values to estimate the frequency errors, and the estimated frequency error values are shared and added up by the phase errors to convert the phase errors to frequency errors.

Meanwhile, although the first complex multiplier 231 disposed at the carrier wave recovery unit 230, the first phase error detection unit 241, the second complex multiplier 232, and the second phase error detection unit 242 are all aligned at the rear end of the symbol timing recovery unit 210 in the present implementation, it may be possible to arrange these units at the other locations or the first and second complex multiplier 231, 232 may be arranged at mutually different locations. In other words, the first complex multiplier 231, the first phase error detection unit 241, the second complex multiplier 232 and the second phase error detection unit 242 may be located at the same position or mutually different positions, i.e., at a front end of the re-sampler 211 before the symbol timing is restored, at a rear end of the matched filter 250 or at the rear end of the DC remover 270.

Furthermore, although the phase error detection units 241, 242 of the carrier wave recovery unit 230 are illustrated in a plural number, the number is not limited in the present implementations, and it should be apparent that the phase error detection units 241, 242 may be additionally constructed with a phase error detection unit having other phase error detection characteristics, a complex multiplier and a numerically controlled oscillator.

Figure 7:
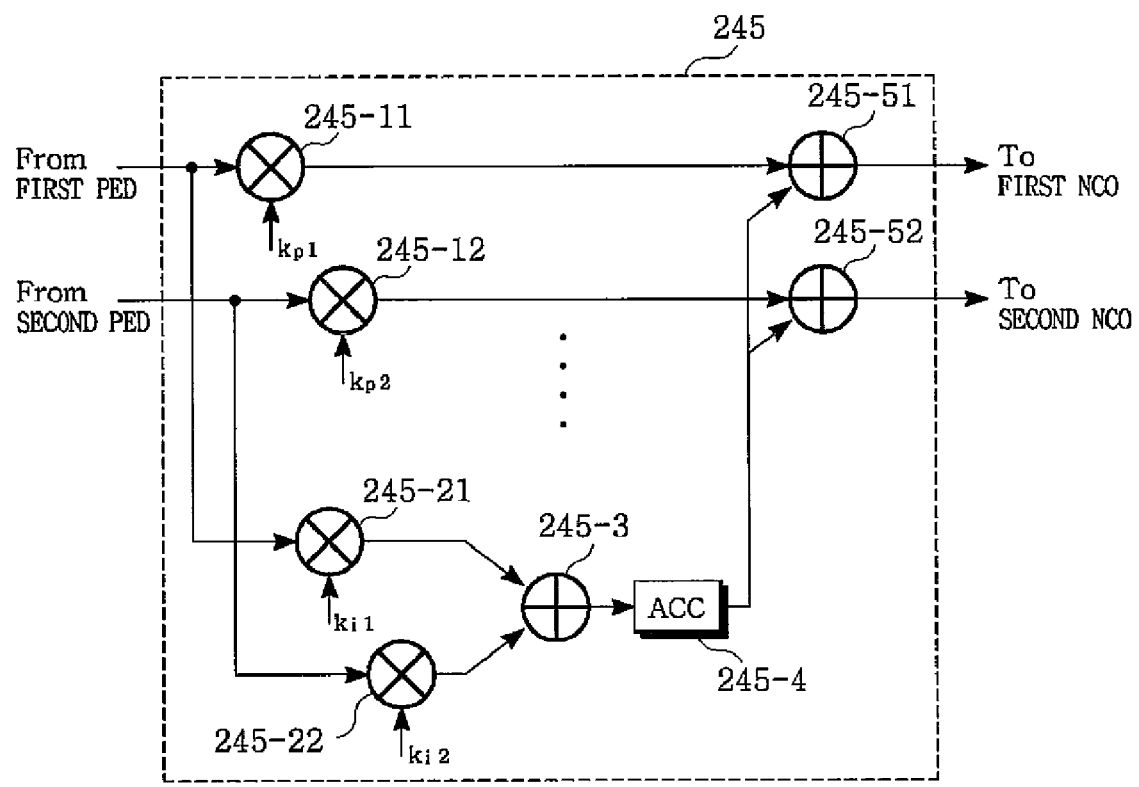
FIG. 7 is a block diagram illustrating a detailed construction of a frequency sharing loop filter of FIG. 4.

FIG. 7 illustrates a detailed construction of the frequency sharing loop filter of FIG. 4 according to an exemplary implementation.

Now, referring to FIG. 7, the frequency sharing loop filter 245 is comprised of a transformed structure of a secondary loop filter that includes a plurality of Kp multipliers 245-11, 245-12, a plurality of Ki multipliers 245-21, 245-22, an adder 245-3, an accumulator 245-4 and a plurality of adders 245-51, 245-52.

The frequency sharing loop filter 245 comprises: a first Kp multiplier 245-11 multiplying a phase error value of the first phase error detection unit 241 and a proportional gain control signal (Kp1) outputted from the controller 235 by receiving the phase error value of the first phase error detection unit 241 and the proportional gain control signal (Kp1) outputted from the controller 235; a second Kp multiplier 245-12 multiplying a phase error value of the second phase error detection unit 242 and a proportional gain control signal (Kp2) outputted from the controller 235 by receiving the phase error value of the first phase error detection unit 242 and the proportional gain control signal (Kp2) outputted from the controller 235; a first Ki multiplier 245-21 multiplying a phase error value of the first phase error detection unit 241 and an integral gain control signal (Ki1) outputted from the controller 235 by receiving the phase error value of the first phase error detection unit 241 and the integral gain control signal (Ki1) outputted from the controller 235; a second Ki multiplier 245-22 multiplying a phase error value of the second phase error detection unit 242 and an integral gain control signal (Ki2) outputted from the controller 235 by receiving the phase error value of the first phase error detection unit 242 and the integral gain control signal (Ki2) outputted from the controller 235; an accumulator 245-4 adding up the outputs of the first and second Ki multipliers 245-21, 245-22 to accumulate phase error values and to calculate a frequency error value of the carrier wave; a first adder 245-51 adding up the phase error value outputted from the first Kp multiplier 245-11 and the frequency error value outputted from the accumulator 245-4 to convert the phase errors to a frequency error values; and a second adder 245-52 adding up the phase error value outputted from the second Kp multiplier 245-12 and the frequency error value outputted from the accumulator 245-4 to convert the phase errors to frequency error values.

In other words, the input signals from the first and second phase error detection unit 241, 242 are inputted to the first and second Kp multiplier 245-11, 245-12, where the first Kp multiplier 245-11 reflects the proportional gain of the first phase error detection unit 241, the first Ki multiplier 245-21 reflects the integral gain of the first phase error detection unit 241, the second Kp multiplier 245-12 reflects the proportional gain of the second phase error detection unit 242, and the second Ki multiplier 245-22 reflects the integral gain of the second phase error detection unit 242.

The outputs of the first and second Ki multiplier 245-21, 245-22 are added up by the adder 245-3 to be inputted to the accumulator 245-4, where the accumulator 245-4 accumulates the phase error value according to the following equation 1 to calculate the frequency error value of the carrier wave.

$$\int \Delta \varnothing dt = \Delta f, \qquad \text{EQUATION 1}$$

where $\Delta \varnothing$ is a phase error value and $\Delta f$ is a frequency error value.

In other words, the adder 245-3 combines the outputs of the first and second Ki multiplier 245-21, 245-22, functioning to reflect the frequency estimate, the accumulator 245-4 accumulates the output signals of the first and second Ki multiplier 245-21, 245-22 to estimate the frequency error of the carrier wave.

The output signal of the accumulator 245-4 is added to the output signals of the first and second Ki multipliers 245-21, 245-22 through the first and second adder 245-51, 245-22, and the added output signals are respectively inputted to first and second numerically controlled oscillators 247, 248.

The first and second numerically controlled oscillator 247, 248 generate a complex sine wave from the signals outputted from the first and second adders 245-51, 245-52 and output to the first and second complex multipliers 231, 232.

Successively, the first complex multiplier 231 multiplies the baseband complex signal outputted from the symbol timing recovery unit 210 by the complex sine wave generated by the first numerically controlled oscillator 247 to correct the frequency offset {positioning the pilot signal to a zero frequency point (f=0)}, whereby the complex signal is precisely converted to the baseband signal.

Furthermore, the second complex multiplier 232 multiplies the baseband complex signal outputted from the symbol timing recovery unit 210 by the complex sine wave generated by the second numerically controlled oscillator 248 to correct the frequency offset, whereby the complex signal is accurately converted to a baseband signal.

Meanwhile, the controller 235 generates a signal necessary for controlling the frequency sharing loop filter 245 using output signals of the first and second complex multipliers 231, 232 as input thereof, and monitors the output signals from the first and second complex multipliers 231, 232 to control parameters (Kp, Ki) of the frequency sharing loop filter 245, thereby controlling the overall contribution.

For example, if the attenuation of the pilot signal is great, the controller 235 controls in such a manner that contribution of the phase error generated from the first phase error detection unit (241. dependence on the pilot signal during restoration of carrier wave) is decreased, and alternatively, the control to increase the contribution of the phase error generated by the second phase error detection unit (242. no dependence on the pilot signal during restoration of the carrier wave) can complement and overcome the weakness of the carrier wave restoration by the first phase error detection unit 241.

As a result, the controller 235 monitors the complex signals respectively inputted from the first and second complex multipliers 231, 232 to control the calculation of the phase of the frequency sharing loop filter 245 and the frequency error values, receives the baseband complex signals outputted from the first and second complex multipliers 231, 232 and selects one of the two and outputs.

It makes no difference if the controller 235 selects either one signal from the first complex multiplier 231 or the signal from the second complex multiplier 232. This is because the frequency sharing loop filter 245 adds the phase error values from the first and second phase error detection units 241, 242, which are accumulated by the accumulator 245-1 to estimate the frequency error values and to share the frequency error values, such that it is possible for the first and second complex multipliers 231, 232 to restore the carrier wave regardless of the complex signal characteristics.

Figure 8:
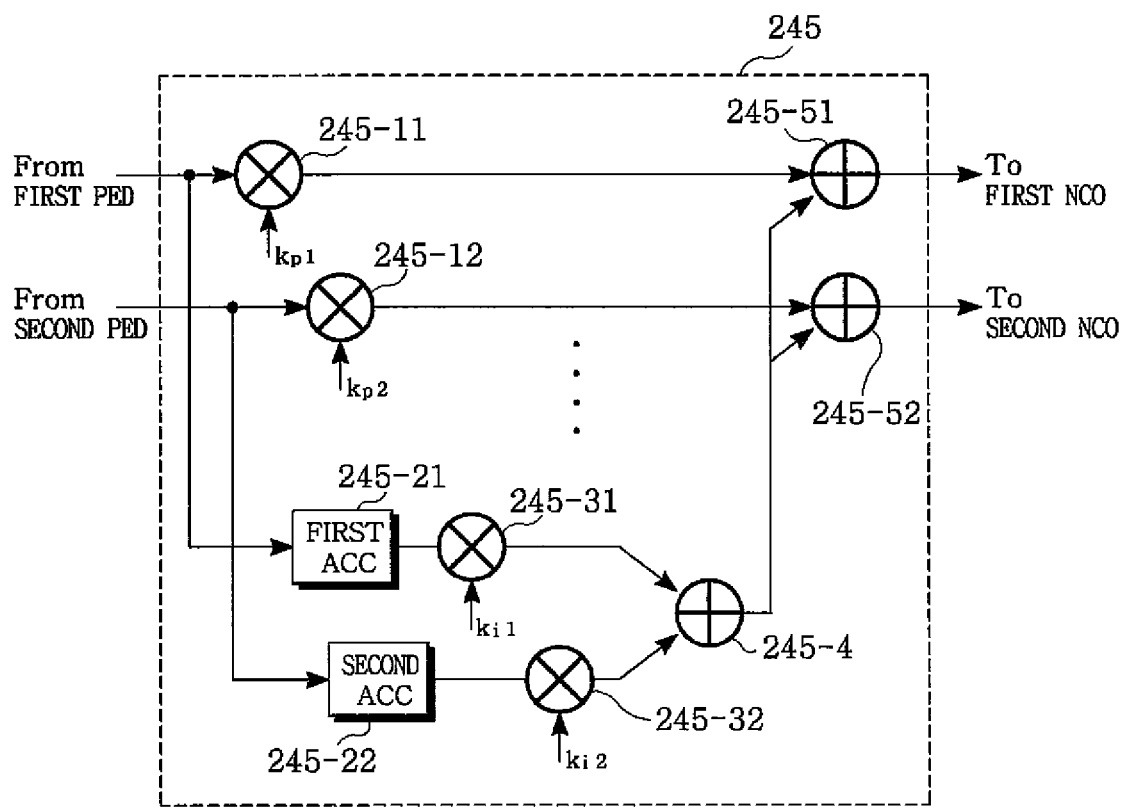
FIG. 8 shows another exemplary implementation of a frequency sharing loop filter of FIG. 4.

FIG. 8 shows another exemplary implementation of a frequency sharing loop filter of FIG. 4, where the frequency sharing loop filter 245 includes a plurality of Kp multipliers 245-11, 245-12, a plurality of accumulators 245-21, 245-22, a plurality of Ki multipliers 245-31, 245-32, an adder 245-4 and a plurality of adders 245-51, 245-52.

The signals outputted from the first and second phase error detection units 241, 242 are respectively inputted to the plurality of Kp multipliers 245-11, 245-12 and the first and second accumulators 245-21, 245-22 and the output signals from the first and second accumulators 245-21, 245-22 are multiplied by the integral gain control signals (Ki1, Ki2) outputted from the controller 235 via the first Ki multiplier 245-31 and the second Ki multiplier 245-32 and respectively inputted to the adder 245-4.

In other words, the combination of output signals from the accumulators 245-21, 245-22 in FIG. 8 is different from that of FIG. 7. The signals that have passed the first and second accumulators 245-21, 245-22 carry the frequency error information, such that the outputs signals from the first and second accumulators 245-21, 245-22 are combined by the adder 245-4 to estimate the frequency errors of the carrier wave. The parameter signals (Ki1, Ki2) inputted to the first and second Ki multipliers 245-31, 245-33 are outputted to the controller 235.

As mentioned in FIG. 7, the controller 235 monitors the status of the input signals from the first and second phase error detection units 241, 242 to control in such a fashion that contribution degree to the frequency estimation by the first and second phase error detection units 241, 242 via the parameter (Kp, Ki) signals can be varied.

Now, an exemplary implementation of carrier wave restoration process will be described in detail with reference to FIGS. 4 to 7.

Figure 9A:
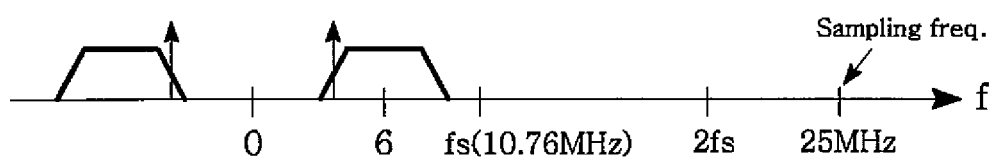
FIGS. 9a to 9g are signal spectrums outputted from each constitutional element of FIG. 4.

First, the A/D converter 150 samples the received passband analog signal by a fixed frequency, i.e., 25 MHz to convert to a passband digitalized signal, and the converted passband digitalized signal is inputted to the phase splitter 170. The signal spectrum inputted to the phase splitter 170 is illustrated in FIG. 9a, where the signal spectrum forms a 6 MHz band spectrum around ±6 MHz passband frequency, and this signal spectrum is inputted to the phase splitter 170.

Figure 9B:
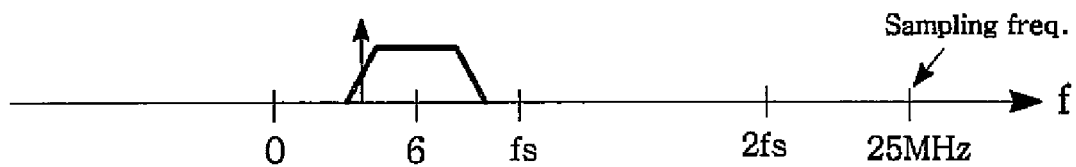

The phase splitter 170 uses the Hilbert transform to convert the passband real component signal to a passband complex signal, and outputs to the down converter 190. The signal spectrum outputted from the phase splitter 170 is illustrated in FIG. 9b, where the signal spectrum around −6 MHz in the phase splitter 170 is removed, and only the signal spectrum around +6 MHz is inputted to the complex multiplier 191 of the down converter 190.

The down converter 190 receives the digitalized passband signal outputted from the phase splitter 170 and a conjugated complex value relative to the complex sine wave of the fixed frequency outputted from the NCO 195 and multiplies using a complex multiplier 191 to allow the digitalized passband signal to be converted to a near baseband signal.

Figure 9C:
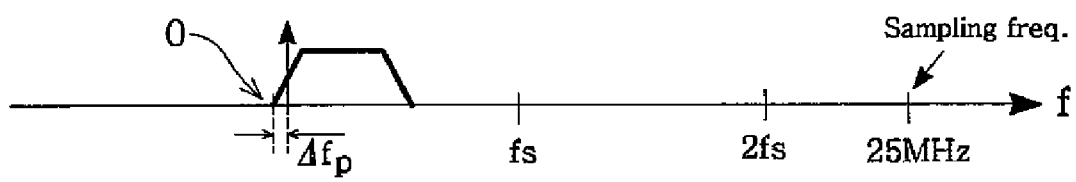

The complex multiplier 191 multiplies the passband complex signal outputted from the phase splitter 170 by the conjugated complex value of the complex sine wave outputted from the NCO 195 to output a baseband signal, but the near baseband complex signal outputted from a complex multiplier 191 is outputted with the frequency offset still remaining as shown in FIG. 9c.

The near baseband complex signal that contains the frequency offset is supplied to the resampler 211 of the symbol timing recovery unit 210, where the resampler 211 samples the complex signal by the clock frequency (2 fs, 21.52 MHz) twice the symbol frequency (fs; i.e., 10.76 MHz) predetermined by the transmission terminal, and the signals that have passed the re-sampler 211 are respectively inputted to the first and second complex multipliers 231, 232 of the carrier wave recovery unit 230.

The passband timing error detection unit 213 extracts the upper sideband signal from the signal spectrum generated by the re-sampler 211 to monitor zero-crossing status and to discriminate the timing synchronization error, where the timing error signal passes the loop filter 215 operating at a symbol frequency (fs; 10.76 MHz) to be lowpass filtered.

The signal lowpass filtered and outputted by the loop filter 215 contains the direct current (DC) component, where the direct current component is inputted to an NCO 217. The NCO 217 provides the sampling clock whose error timing has been compensated in response to inputted DC to the re-sampler 211. The symbol timing recovery unit 210 can restore the symbol timing even if the frequency offset is available in the baseband complex signal.

Through these processes, the symbol timing recovery unit 210 checks the timing error using the signal outputted from the complex multiplier 191 to restore the symbol timing. Of course, the symbol timing is restored by the symbol timing recovery unit 210, but as illustrated in the signal spectrum of FIG. 9d, the output signal of the re-sampler 211 still contains the frequency offset. The baseband signal whose frequency offset is not compensated corresponds to the passband signal, such that the timing error detection unit 215 must be employed to correctly match the frequency band signal that has passed the re-sampler 211 to the predetermined 5.38 MHz.

The complex signal outputted by the re-sampler 211 is inputted to the first and second complex multipliers 231, 232. Although the first complex multiplier 231 multiplies the complex signal outputted by the re-sampler 211 by the complex sine wave outputted by the first NCO 247 to output a baseband signal, the complex signal outputted from the first complex multiplier 231 is outputted still containing the frequency offset before the frequency offset is corrected. In other words, if the frequency offset is corrected, the pilot signal is positioned at a zero frequency point (f=0).

Like the first complex multiplier 231, although the second complex multiplier 232 multiplies the complex signal outputted by the re-sampler 211 by the complex sine wave outputted by the second NCO 248 to output a baseband signal, the complex signal outputted from the second complex multiplier 231 is outputted still containing the frequency offset before the frequency offset is corrected.

The output signals of the first and second complex multipliers 231, 232 are respectively inputted to the first and second phase error detection units 241, 242 of the phase/frequency error estimating unit 240 and the controller 235.

The complex signal inputted to the first phase error detection unit 241 passes the lowpass filter (LPF. 241-1) to extract a pilot signal contained in the complex signal, the real component pilot signal {Re (•)} is directly or via the delayer 241-2 to the multiplexer (MUX. 241-3), and the output signal of the multiplexer 241-3 and the imaginary component signal {Imag (•)} outputted from the lowpass filter 241-1 are inputted to and multiplied by the multiplier 241-4.

The construction thus described is used to broaden the frequency restoration scope. For example, the multiplexer 241-3 selectively outputs the real component signal delayed by the delayer 241-2 before the carrier wave frequency is restored, but once the carrier wave frequency is restored, the multiplexer 241-3 selectively outputs the real component signal that is not delayed.

Figure 9D:
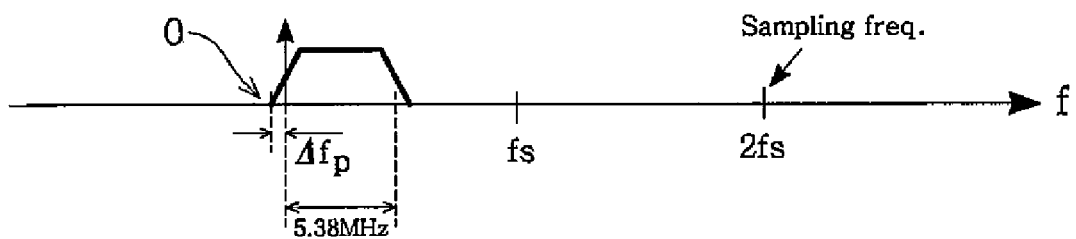
Figure 9E:
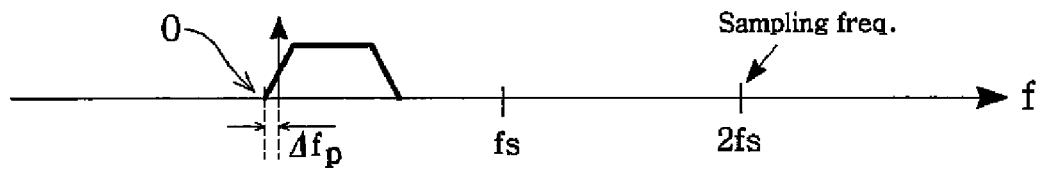

Furthermore, the complex signal inputted to the second phase error detection unit 242 is down-sampled using a frequency having the same symbol frequency by the first down-sampler 242-1, and the output complex signal having the spectrum as shown in FIG. 9e is inputted to the OQAM signal generator 242-2.

Figure 9F:
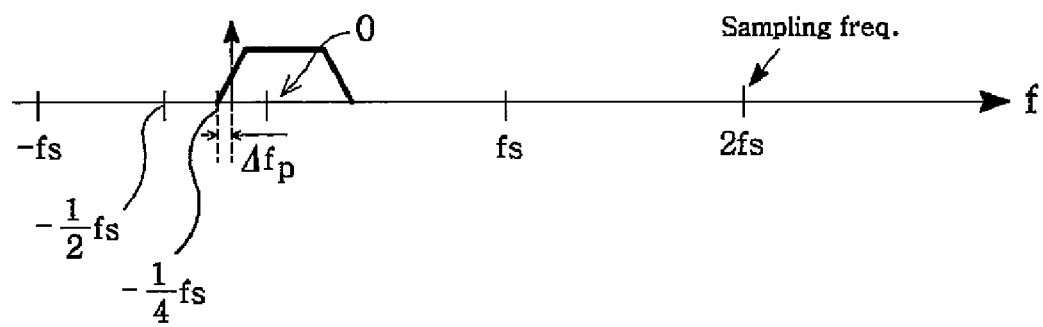

Successively, the OQAM signal generator 242-2 receives the complex signal having the spectrum as illustrated in FIG. 9e via the second complex multiplier 232 and a complex sine wave whose central frequency is ¼ the symbol frequency and multiplies. If there is any frequency offset, the output signal from the OQAM signal generator 242-2 is such that the central frequency of the signal spectrum does not accurately match the zero frequency point (f=0) as shown in FIG. 9f, and is a bit tilted to one side as much as the frequency offset.

Although the OQAM signal generator 242-2 is shown as a complex multiplier having the output complex signal of the first down-sampler 242-1 and the complex sine wave as inputs, the OQAM signal generator 242-2 may be actually and simply embodied without recourse to the complex multiplier as the central frequency of the inputted complex sine wave is ¼ the symbol frequency.

In other words, if n is 0, 1, 2, 3, . . . , in the inputted complex sine wave $(e^{-j(n/2)\pi})$, the complex sine wave will repeatedly have values of $1(e^{-j\cdot 0}=1)$, $-j(e^{-j(\pi/2)}=\cos(\pi/2)-j\sin(\pi/2)=-j)$, $-1(e^{-j\cdot\pi}=\cos\pi-j\sin\pi=-1)$, $j(e^{-j\cdot(3/2)\pi}=j)$, . . . , such that the OQAM signal generator 242-2 may be embodied by a simple code transform of the signal inputted from the first down sampler 242-1.

If the real and imaginary components are split from the output complex signal from the OQAM signal generator 242-2 to be inputted to the phase error calculation unit 242-3, the phase error value of frequency offset may be obtained using the phase error calculation unit 242-3 that employs the OQAM method without recourse to the pilot signal.

The phase error calculation unit 242-3 receives the real component {I (k)} and imaginary component {Q (k)} OQAM signal outputted from the OQAM signal generator 242-2 and calculates to output a phase error value of tan h(I(k)*Q(k))−tan h(Q(k−½)*I(k−½)).

Meanwhile, the complex signal inputted to the OQAM signal generator 242-2 is inputted in the same frequency (10.76 MHz) as the symbol frequency, and if the complex signal inputted to the phase error calculation unit 242-3 is transformed to an OQAM signal, a symbol interval of the transformed OQAM signal is lengthened two-fold by the first and second delayers 242-32, 242-33 of the phase error calculation unit 242-3 whereas the sampling frequency is the same but the symbol period is lengthened. Based on the OQAM signal outputted from the OQAM signal generator 242-2, the output signal of the phase error calculation unit 242-3 is twice over-sampled over the complex signal of the OQAM signal generator 242-2. In other words, 1 $f_{S,VSB}$=10.76 MHz=2 $f_{S,OQAM}$.

The first and second delayers 242-32, 242-33 are delayed as much as one clock based on 1 $f_{S,VSB}$, The first and second delayers 242-32, 242-33 are delayed ½ symbol based on the OQAM signal.

Because the phase error calculation unit 242-3 is operated in a two-fold over-sampled time domain, only symbol unit baseband phase error value is extracted by the sampling frequency of ½ fs (i.e., 5.38 MHz) from the phase error values in the rear end second down-sampler 242-4.

In other words, the second down-sampler 242-4 extracts by ½ fs sampling frequency the phase error value corresponding to the frequency offset outputted from the phase error calculation unit 242-3 and outputs to the up-sampler 242-5, where the up-sampler 242-5 samples by a clock speed (2 fs) of the second complex multiplier 232 side the baseband phase error inputted at the 1 $f_{S,OQAM}$(5.38 MHz) speed in order to match the operational frequency with the portion compensating the baseband phase.

The phase error signal that has passed the up-sampler 242-5 with the matched operation speed is inputted to the frequency sharing loop filter 245. As a result, the phase error signals outputted from the first and second phase error detection units 241, 242 are respectively inputted to the first and second Kp multipliers 245-11, 245-12 and first and second Ki multipliers 245-21, 245-22 of the frequency sharing loop filter 245.

The outputs from the first and second Ki multipliers 245-21, 245-22 are added up by the adder 245-3 and inputted to the accumulator 245-4, where the accumulator 245-4 accumulates the phase error values to calculate the frequency error values of the carrier wave. In other words, the adder 245-3 combines the outputs of the first and second Ki multipliers 245-21, 245-22 to reflect on the frequency estimation, and the accumulator 245-4 accumulates the output signals from the first and second Ki multipliers 245-21, 245-22 to estimate the frequency errors of the carrier wave.

Meanwhile, the phase error signals outputted from the first and second Kp multipliers 245-11, 245-12 are respectively added up to the frequency error values estimated by the accumulator 245-4 via the first and second adders 245-51, 245-52 to be converted to the frequency error signals, and the converted frequency error signals are respectively inputted to the first and second NCOs 247, 248.

The first and second NCOs 247, 248 generate complex sine waves each having the frequency and phase estimated by the signal outputted from the first and second adders 245-51, 245-52 and output the complex sine waves to the first and second complex multipliers 231, 232. As a result, the first complex multiplier 231 multiplies the baseband complex signal outputted from the symbol timing recovery unit 210 by the complex sine wave having the frequency and phase estimated by the signal from the first NCO 247 to correct the frequency offset {the pilot signal being positioned on a zero frequency point (F=0)}, whereby the complex signal is precisely transformed to baseband signal.

Figure 9G:
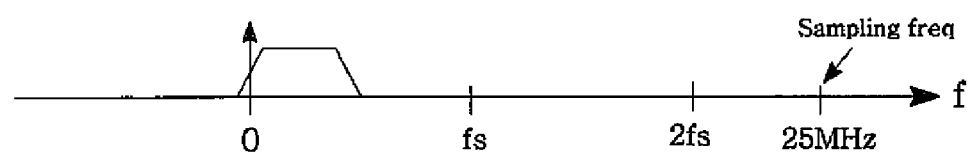

Furthermore, the second complex multiplier 232 multiplies the baseband complex signal outputted from the symbol timing recovery unit 210 by the complex sine wave having the frequency and phase estimated by the signal from the second NCO 248 to correct the frequency offset, whereby the complex signal is precisely transformed to baseband signal, as shown in FIG. 9g.

Under the presumption that the carrier wave recovery unit 230 accurately has corrected the phase error which is the frequency offset, the output signals from the first and second complex multipliers 231, 232 are such that the pilot signal is precisely located on a zero frequency point (f=0) to enable an accurate transformation to the baseband signal as the signal spectrum in FIG. 9g.

The controller 235 uses the output signals from the first and second complex multipliers 231, 232 as inputs to generate a signal necessary for control of the frequency sharing loop filter 245, where the output signals from the first and second complex multipliers 231, 232 are monitored to control the overall contribution by controlling the parameters (Kp, Ki) of the frequency sharing loop filter 245. For example, if the attenuation of the pilot signal is great, the controller 235 controls in such a manner that the contribution of the phase error generated by the first phase error detection unit (241. dependence on the pilot signal during the carrier wave restoration) is decreased. Conversely, the controller 235 controls in such a fashion that the contribution of the phase error generated by the phase error detection unit (242. no dependence on the pilot signal during the carrier wave restoration) is increased to thereby complement and overcome the weakness of the carrier wave restoration by the first phase error detection unit 241.

As a result, the controller 235 monitors the complex signals respectively inputted from the first and second complex multipliers 231, 232 to control the calculation of the phase of the frequency sharing loop filter 245 and the frequency error values, receives the baseband complex signals outputted from the first and second complex multipliers 231, 232 and selectively outputs one of the two.

Successively, the signal outputted by the controller 235 is inputted to the matched filter 250, where the matched filter 250 removes the aliasing contained in the baseband complex signal, which is then inputted to the DC remover 270.

Although in the instant exemplary implementation, the first complex multiplier 231 of the carrier wave recovery unit 230, the first and second phase error detection units 241, 242 and the second complex multiplier 232 are all arranged at the rear end of the symbol timing recovery unit, it may be possible to arrange these units at other locations or the first and second complex multipliers 231, 232 may be arranged at mutually different positions. In other words, the first complex multiplier 231 and the first phase error detection unit 241, and the second complex multiplier 232 and the second phase error detection unit 242 may be arranged at the same position, or mutually different positions, i.e., at a front end of the resampler 211 which is before the symbol timing restoration, at the rear end of the matched filter 250, or at the rear end of the DC remover 270.

As apparent from the foregoing, in the digital broadcasting receiver for receiving VSB modulation type broadcasting signal, the pilot signal or baseband complex signal shape is used in response to the reception signal status to correct the frequency offset of the carrier wave, such that there are advantages in that, even in a frequency-selective fading channel environment, the carrier wave restoration performance is not deteriorated, and even in the frequency-selective fading channel environment, the carrier wave restoration performance is excellent to enhance the performance of the digital broadcasting receiver.

Figure 10:
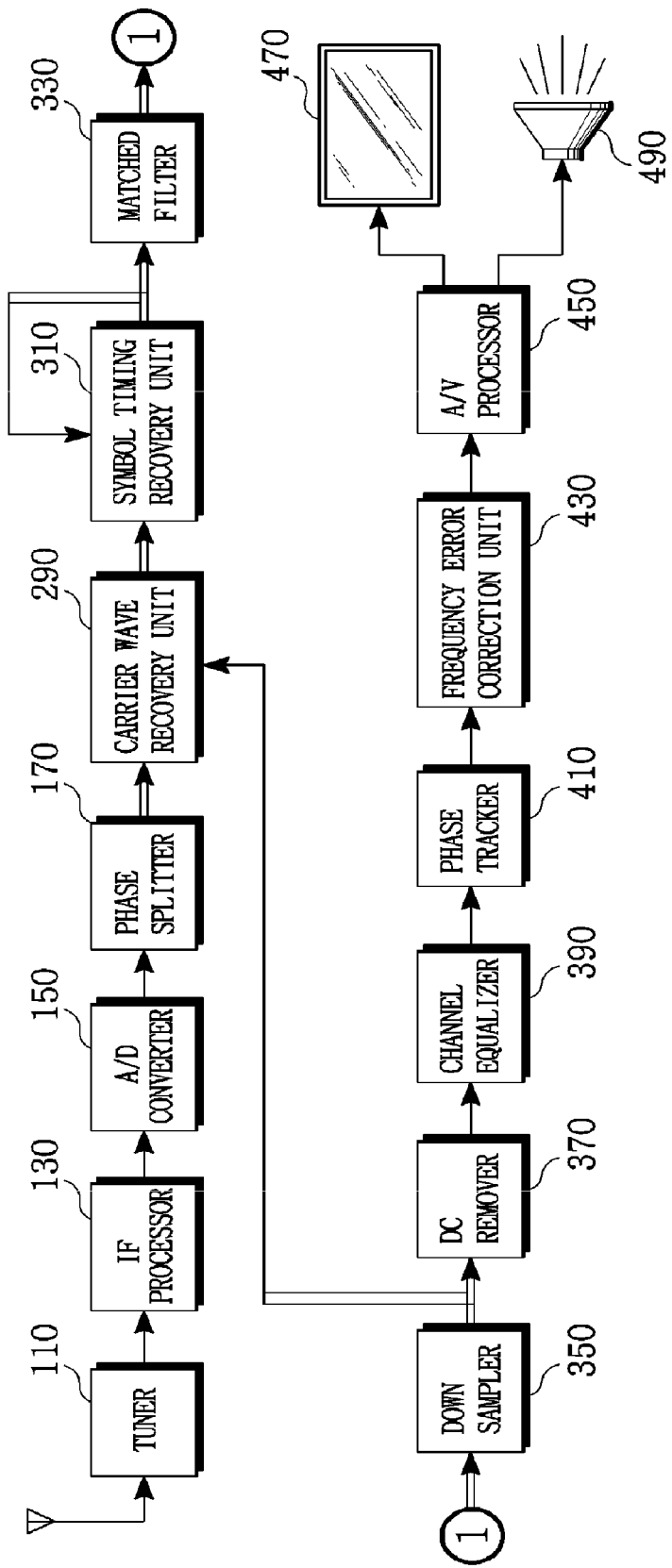
FIG. 10 shows another exemplary implementation of a circuit block diagram illustrating a carrier wave recovery unit of a digital broadcasting receiver.

FIG. 10 shows another exemplary implementation of a circuit block diagram illustrating a carrier wave recovery unit of a digital broadcasting receiver.

Referring to FIG. 10, the carrier wave recovery unit comprises: a tuner 110, an intermediate frequency (IF) processor 130, an analog-to-digital (A/D) converter 150, a phase splitter 170, a carrier wave recovery unit 290, a symbol timing recovery unit 310, a matched filter 330, a down sampler 350 and a direct current (DC) remover 370.

FIGS. 10 to 14 illustrate a construction capable of correcting frequency offset of carrier wave using a baseband complex signal without recourse to the pilot signal, where the construction of the phase error detection unit 242 in the phase/frequency error correction unit 230 illustrated in FIG. 6 is used to embody the carrier wave recovery unit 290.

The tuner 110, the IF processor 130 and the A/D converter 150 in FIG. 10 have the same construction and function as those of FIG. 3, such that there will be no detailed explanation thereto.

The phase splitter 170 receives the digitalized passband signal from the A/D converter 150 to convert the passband signal to complex signal (I signal, Q signal) and outputs the complex signal, where the signal is split to real component and imaginary component passband signals having a 90-degree phase difference, and outputted to the carrier wave recovery unit 290. For the convenience of disclosure, the real component signal is called I signal outputted from the phase splitter 170 and the imaginary component signal is called Q signal.

The carrier wave recovery unit 290 multiplies the passband complex signal outputted from the phase splitter 170 by the complex conjugate of the complex sine wave having a pilot signal ($f_{p,est}$) estimated by the complex signal shape, not the pilot signal by the frequency and phase locked loop (FPLL) system applied with a predetermined OQAM method to correct the frequency offset, where the pilot signal is transformed to a baseband signal located near zero (f=0).

The symbol timing recovery unit 310 receives the signal converted by the carrier wave recovery unit 290 to sample the baseband signal by the frequency (3 $f_{S,VSB}$) precisely twice the symbol frequency via a predetermined FPLL system comprised of a re-sampler 311, a passband timing error detection unit 313, a loop filter 315 and a NCO 317, analyzes the sampled signal to detect the timing error, adjusts the sampling time in response to the timing error and synchronizes the symbol timing.

The matched filter 330 is a fixed coefficient I, Q digital matched filter having the same roll-off value as that of a complex square root raised cosine filter used in the transmitter. In so doing, the matched filter 330 removes the aliasing from the baseband complex signal outputted from the symbol timing recovery unit 310.

The down-sampler 350 receives a baseband signal synchronized by a frequency precisely twice the symbol frequency that is outputted from the matched filter 330 to down-sample the synchronized baseband signal by the frequency (1 $f_{S,VSB}$) precisely the same as the symbol frequency, and outputs the down-sampled synchronized baseband signal to the carrier wave recovery unit 290 and the DC remover 370 for correcting the frequency offset of the output signal.

The DC remover 370 removes the pilot signal inserted for facilitating the carrier wave restoration and outputs the baseband signal to a channel equalizer 390 for removing the inter-symbol interference (ISI).

A phase tracker 310 corrects the residual phases not completely removed by the carrier wave recovery unit 290 and outputs the corrected residual phases to a forward error correction unit 330.

The forward error correction unit 330 corrects the error of the phase-corrected signal and outputs to an audio-video (A/V) processor. In other words, a transmitter such as a broadcasting station selects a technique appropriate for the system to transmit a transmission signal in an encoded format, and a receiver such as a digital broadcasting receiver decodes the signal to correct the error that has been generated in the midst of passing the channels. The forward error correction unit is a block performing these encoding and coding processes.

The A/V processor 350 restores to the original signals the video and voice signals compression-processed by Moving Picture Experts Group-2 (MPEG-2) and Dolby AC-3 methods, where the video signal is transmitted to a monitor 370 to allow being viewed, and the voice signal is transmitted to a speaker 390 to allow being heard.

Figure 11:
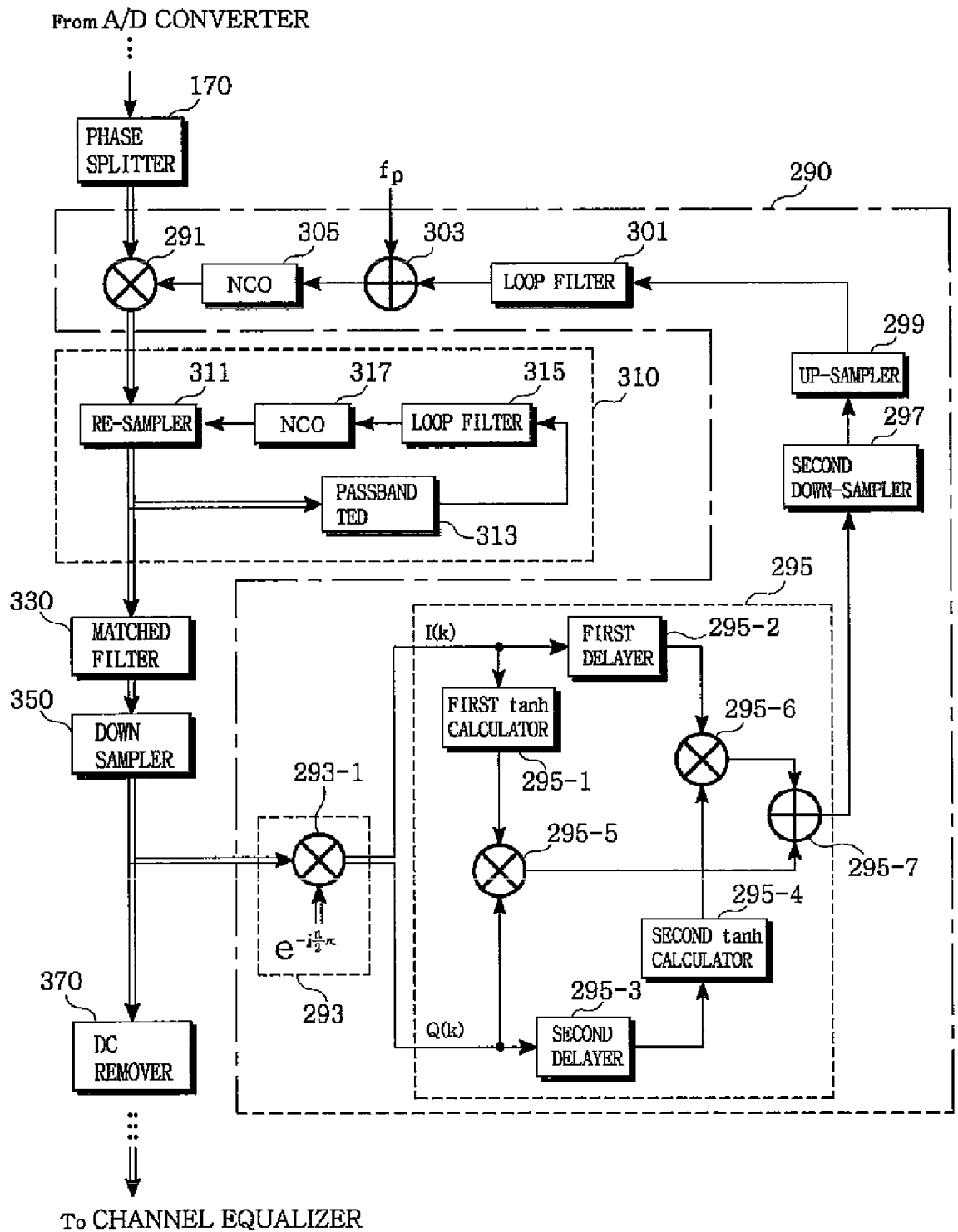
FIG. 11 is a block diagram illustrating a detailed construction of a carrier wave recovery unit and a symbol timing recovery unit of FIG. 10.

FIG. 11 is a block diagram illustrating a detailed construction of a carrier wave recovery unit and a symbol timing recovery unit of FIG. 10, where the FPLL system is employed to restore the timing and phase error of the carrier wave.

The carrier wave recovery unit 290 is an OQAM type FPLL system that includes a first complex multiplier 291, an OQAM signal generator 293, a phase error detection unit 295, a second down-sampler 297, an up-sampler 299, a loop filter 301, an adder 303 and an NCO 305.

The symbol timing recovery unit 310 is an FPLL system that includes a re-sampler 311, a passband timing error detection unit 313, a loop filter 315 and an NCO 317.

First of all, the first complex multiplier 291 of the carrier wave recovery unit 290 multiplies the passband complex signal outputted from the phase splitter 170 by the complex conjugate of the complex sine wave having a pilot signal ($f_{p,est}$) estimated by the complex signal shape to correct the frequency offset, whereby the passband complex signal is accurately transformed to a baseband signal.

The complex signal transformed to the baseband signal passes the symbol timing recovery unit 310 to be sampled by 2 $F_{s,VSB}$ which is precisely twice the symbol frequency, where the symbol timing recovery unit 310 uses the 2 $F_{s,VSB}$-sampled signal to determine the sampling timing error of the symbol frequency and corrects the sampling timing in response to the timing error to synchronize the symbol timing (clock).

Figure 12:
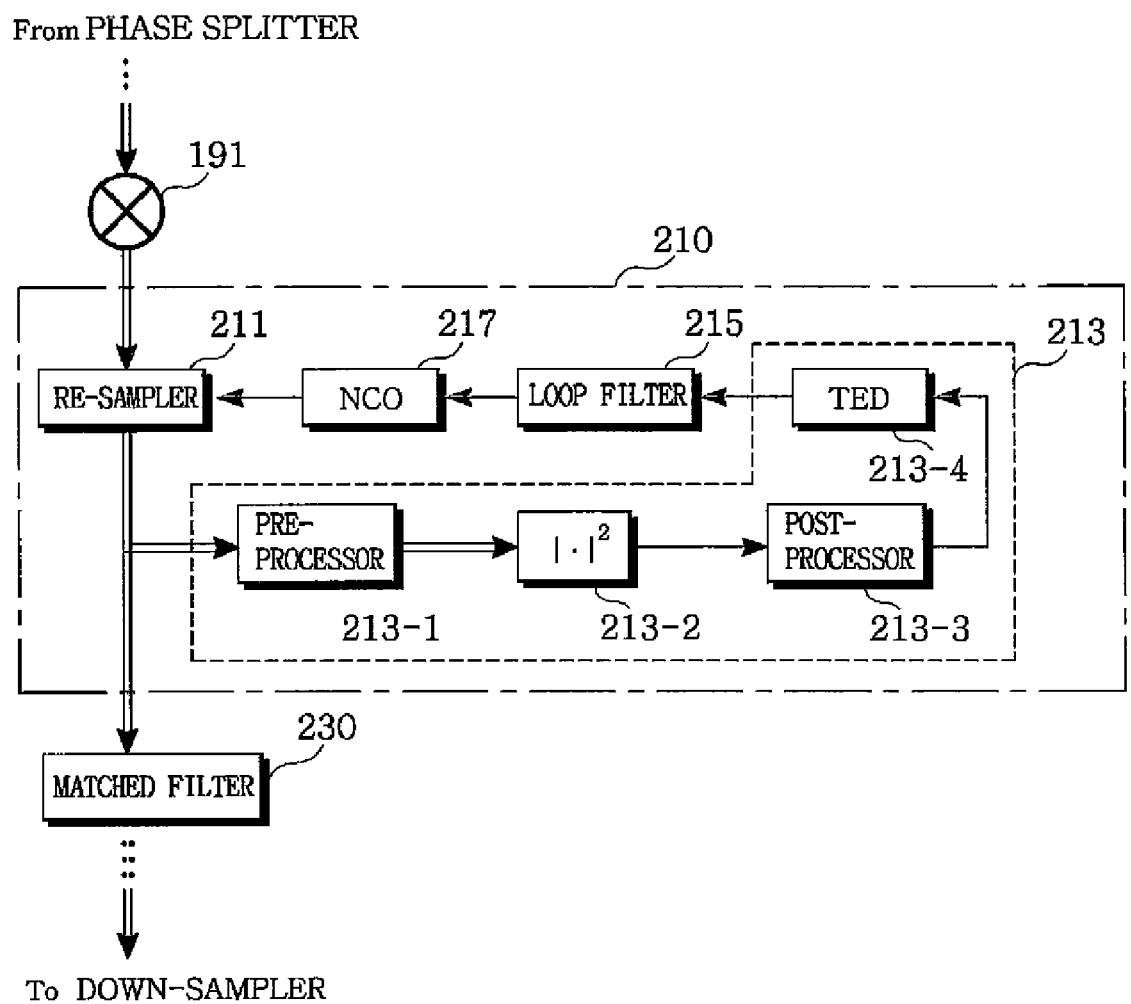
FIG. 12 is a block diagram illustrating a detailed construction of a symbol timing recovery unit.

Now, referring to FIG. 12, the symbol timing recovery unit 310 includes a re-sampler 311, a preprocessor 313-1, a conjugate multiplier 313-2, a post-processor 313-3, a timing error detecting unit 313-4, a loop filter 315 and an NCO 317.

The reason the re-sampler 311 is needed in FIG. 12 is that the A/D converter 150 uses the fixed frequency to sample the analog signal, and if it is presumed that the A/D converter 150 uses a variable frequency to sample the analog signal, there is no need of the re-sampler 311 and instead the output of the NCO is inputted to the A/D converter 150.

In other words, the re-sampler 311 receives from the first complex multiplier 291 the passband complex signal in which only the carrier wave frequency offset is corrected, to sample the complex signal twice the symbol frequency i.e., the symbol frequency being 10.76 MHz, and to generate the sample. The output of the re-sampler 311 is outputted to the pre-processor 313-1 and simultaneously to the matched filter 330.

The pre-processor 313-1 precisely filters the output of the resampler 311 in order to reduce the jitters and outputs to the conjugate multiplier 313-2. The conjugate multiplier 313-2 performs a conjugate multiplication relative to the output of the pre-processor 313-1 in order to remove any influence by the carrier wave and outputs to the post-processor 313-3. In other words, the upper sideband spectrum of signal generated by the conjugate multiplier 313-2 is determined by the input spectrum bandwidth regardless of the input signal carrier wave. Therefore, according to the present novel concept, the passband timing error detection unit 313 can be embodied by using a simple zero-crossing detection method.

The post-processor 313-3 can perform the post-processing function for removing DC generated by the conjugate multiplier 313-2 and the jitters by data, and the integral gain control function for maintaining a constant frequency acquisition performance even during the experience of severe channel fading. The output signal of the post-processor 313-3 becomes a sine wave where the central signal Fs/2 is added up by the symbol timing offset, and the sine wave is inputted to the timing error detection unit 313-4. The timing error detection unit 313-4 may comprise any zero-crossing error detection unit that can monitor the zero-crossing of input sine wave.

The timing error signal detected by the timing error detection unit 313-4 passes the loop filter 315 operated by the symbol frequency (fs, 10.76 MHz) to be lowpass filtered. The signal lowpass-filtered and outputted from the loop filter 315 is a DC component, which is in turn inputted to the NCO 317. The NCO 317 provides to the resampler 311 the sampling clock in response to the input DC signal. As noted above, it is possible that the symbol timing recovery unit 310 restores the symbol timing of the baseband signal whose frequency offset is not corrected.

The matched filter 330 receives from the re-sampler 311 the signal sampled twice the symbol frequency to remove the aliasing and output to the down-sampler 350, where the down-sampler 350 samples the baseband complex signal outputted from the matched filter 330 by 1 fs which is the same frequency as the symbol frequency and outputs to the OQAM signal generator 293 of the carrier wave recovery unit 290 and the DC remover 370 respectively.

The OQAM signal generator 293 of the carrier wave recovery unit 290 receives the complex signal outputted from the down-sampler 350 and the complex sine wave ($e^{-j(n/2)\pi}$) whose central frequency is ¼ the symbol frequency, multiplies, and outputs by splitting the complex signal to a real component and an imaginary component. In other words, the OQAM signal generator 293 is the complex multiplier 293-1. The real and imaginary component complex signals outputted from the complex multiplier 293-1 are inputted to the phase error detection unit 295.

The phase error detection unit 295 includes a first tan h calculator 295-1, a first delayer 295-2, a second delayer 295-3, a second tan h calculator 295-4, a first multiplier 295-5, a second multiplier 295-6 and an adder 295-7. Meanwhile, the restoration of carrier wave in the phase error detection unit 295 is done by estimating a phase of the baseband from a reception signal mixed with noise with no consideration to the pilot signal, such that restoration of the carrier wave in the present novel concept is not affected by attenuation of the pilot signal.

As noted in the foregoing, the present novel concept has used correlation between the VSB signal and the offset quadrature amplitude modulation (OQAM) signal for applying the carrier wave restoration to the VSB method without recourse to the pilot signal. The equivalence between the VSB signal and the OQAM signal is well known, such that further explanation thereof will be omitted herein.

The carrier wave restoration algorithm induced by treating a VSB signal as OQAM may be applied as is to the VSB method based on the equivalence, and in implementations of the present novel concept, OQAM method is applied to the restoration of carrier wave to allow the carrier wave to be recovered without the assistance of pilot signal.

Now, operation of detailed construction of the phase error detection unit 295 will be described.

First, the first tan h calculator 295-1 calculates a tan h {I (k)} value by input of the real component signal {I (k)} and the calculated tan h {I (k)} is outputted, and the first delayer 295-2 is delayed by receiving the I (k) signal to generate I (k-½) signal. The second delayer 242-33 is delayed by receiving the imaginary signal {Q (k)} to generate Q (k-½) signal, and the second tan h calculator 295-4 receives the Q (k-½) signal to calculates tan h {Q (k-½)} and outputs.

The first multiplier 295-5 calculates tan h {I (k)*Q(k)} value from outputs of the first tan h calculator 295-1 and the imaginary signal and outputs, and the second multiplier 295-6 calculates tan h {Q (k-½)*I (k-½)} value from outputs of the second tan h calculator 295-4 and the first delayer 295-2 and outputs.

Lastly, when an output signal from the second multiplier 295-6 passes through the adder 295-7, tan h {I (k)*Q(k)}−tan h {Q (k-½)*I (k-½)} value may be obtained, which is the phase error value obtained by the OQAM method.

The FPLL system that includes the loop filter 301 of the carrier wave recovery unit 290, the adder 303 and the NCO 305 corrects the frequency offset by allowing the phase error value thus obtained to be converged to zero.

At the same time, the carrier wave restoration by the OQAM method is based on restoration of symbol timing in terms of algorithm characteristics, such that the phase error detection unit 295 of the carrier wave recovery unit 290 is located at the rear end of the symbol timing recovery unit 310 as shown in FIG. 11. In other words, the passband symbol timing restoration algorithm capable of restoring the symbol timing even under a circumstance where the carrier wave frequency offset is available in order to facilitate a smooth operation of synchronizer, and the baseband phase error must be extracted based on the restored symbol clock.

Figure 13A:
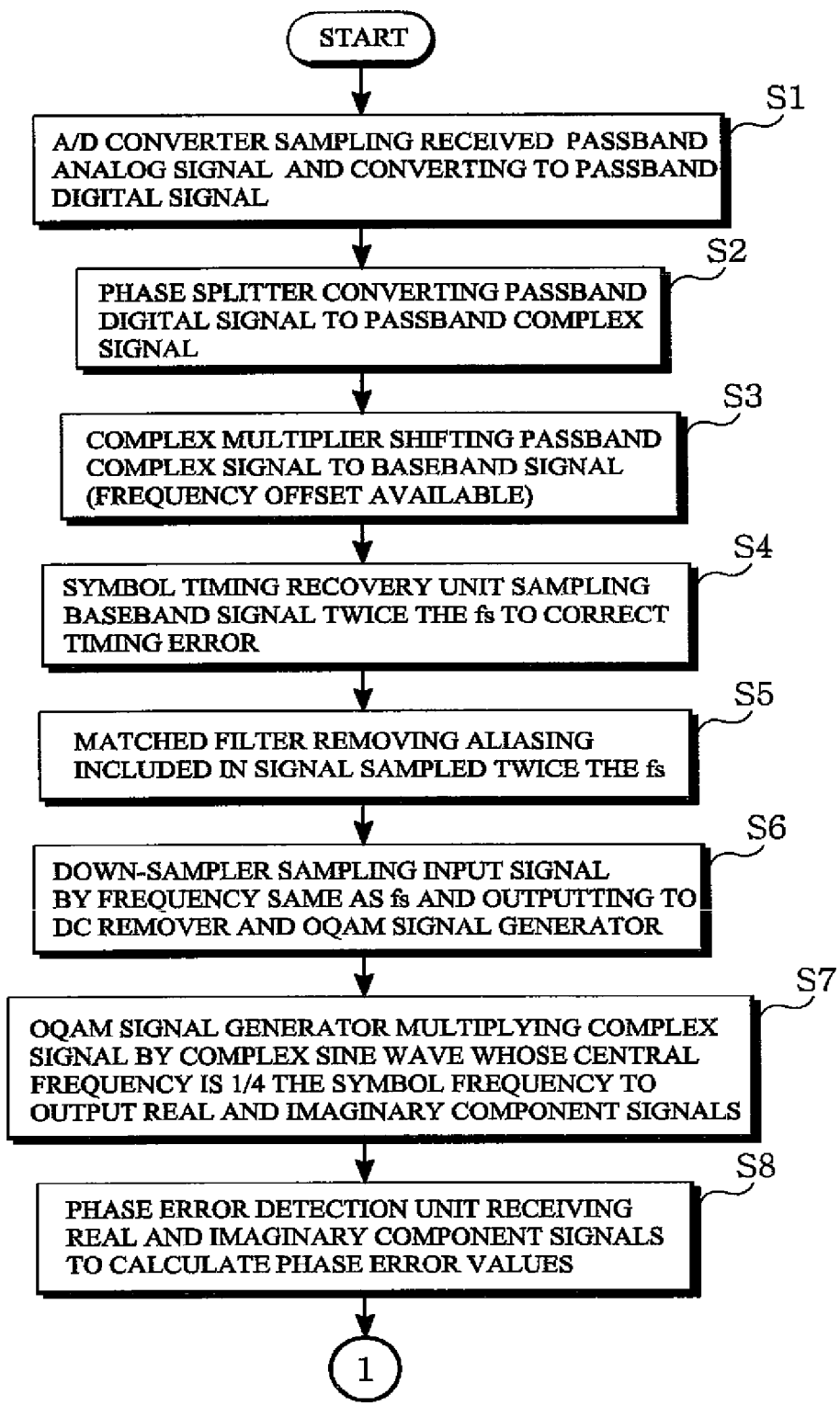
FIGS. 13a and 13b show flowcharts illustrating a carrier recovery process according to an exemplary implementation.
Figure 13B:
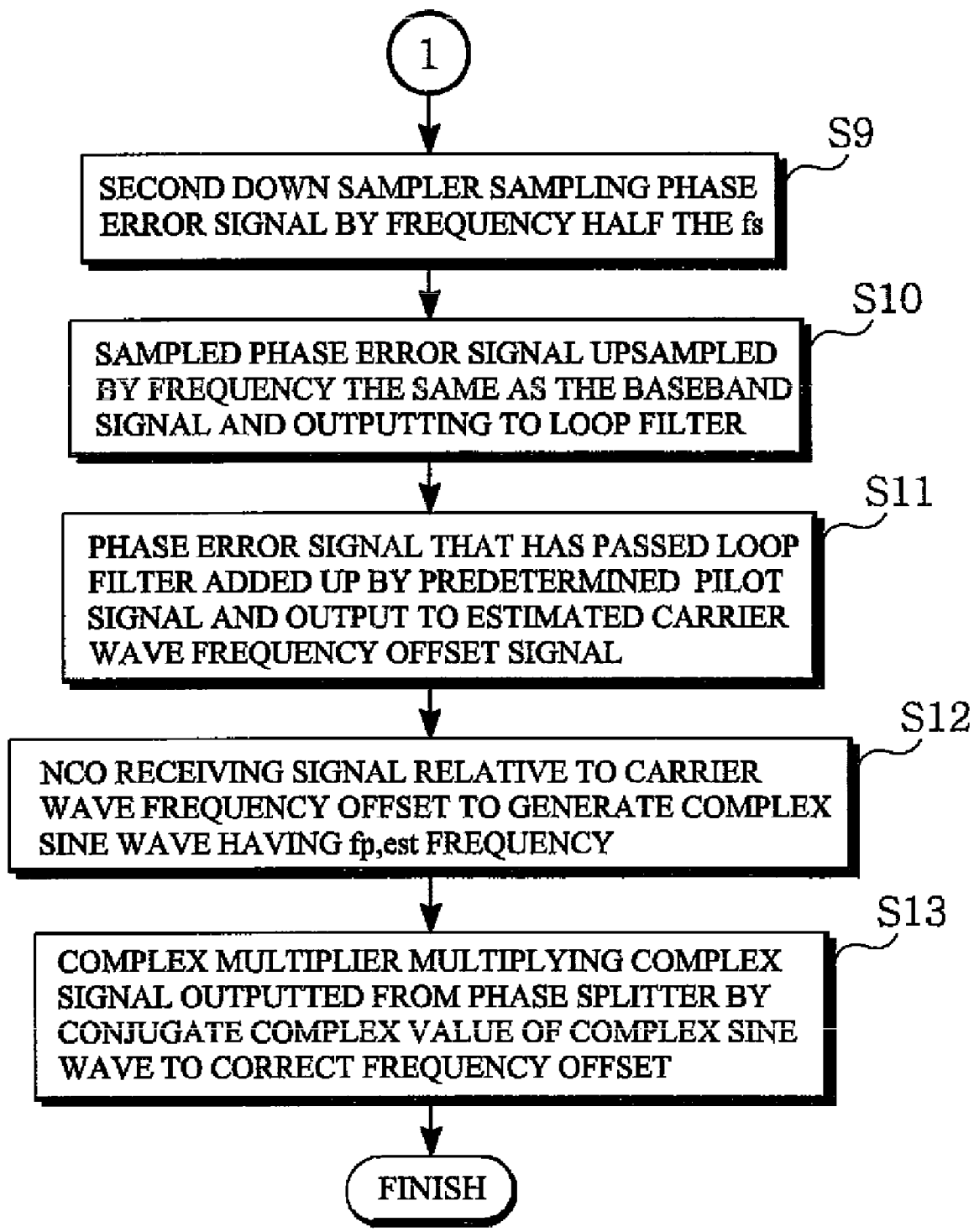

Now, the carrier wave restoring process using the carrier wave recovery unit will be described in detail with reference to flowcharts of FIGS. 13a and 13b, and signal spectrums of FIGS. 9a to 9g.

First, the A/D converter 150 samples the received passband analog signal by a fixed frequency, i.e., 25 MHz to convert to a passband digitalized signal, and the converted passband digitalized signal is inputted to the phase splitter 170 (S1). The signal spectrum inputted to the phase splitter 170 is illustrated in FIG. 9a, where the signal spectrum forms a 6 MHz band spectrum around ±6 MHz passband frequency, and this signal spectrum is inputted to the phase splitter 170.

The phase splitter 170 uses the Hilbert transform to convert the passband real component signal to a passband complex signal, and outputs to the complex signal to the first complex multiplier 291 of the carrier wave recovery unit 290 (S2). The signal spectrum outputted from the phase splitter 170 is illustrated in FIG. 9b, where the signal spectrum around −6 MHz in the phase splitter 170 is removed, and only the signal spectrum around +6 MHz is inputted to the first complex multiplier 291 of the carrier wave recovery unit 290.

Successively, the first complex multiplier 291 multiplies the digitalized passband signal outputted from the phase splitter 170 by the conjugated complex value of complex sine wave outputted from the NCO 305 to output a baseband signal (S3). However, the FPLL system for carrier wave restoration is not operated at the initial stage, such that the baseband signal outputted from the first complex multiplier 291 is outputted with the frequency offset still containing as shown in FIG. 9c. In other words, if the frequency offset is corrected, the pilot signal is located at a zero frequency point (f=0).

The baseband signal that contains the frequency offset is supplied to the re-sampler 311 of the symbol timing recovery unit 310, where the re-sampler 311 samples the baseband signal by the clock frequency (3 fs; 21.52 MHz) twice the symbol frequency (fs; i.e., 10.76 MHz) predetermined by the transmitter, and the sampled signal is outputted to the matched filter 330 and the passband timing error detection unit 313.

The passband timing error detection unit 313 extracts an upper sideband signal from the signal spectrum generated by the re-sampler 311 to determine a timing synchronization error by monitoring a zero-crossing status an, where the timing synchronization error passes the loop filter 315 operating by the symbol frequency (fs; 10.76 MHz) and is lowpass-filtered. The signal lowpass-filtered and outputted from the loop filter 315 has a direct current (DC) component, and the DC signal is inputted to the NCO 317. The NCO 317 provides to the re-sampler 311 the sampling clock in which timing error in proportion to the inputted DC component is compensated (S4). As noted above, the symbol timing recovery unit 310 can restore the symbol timing even if the frequency offset is available in the baseband signal.

Through the aforementioned processes, the symbol timing recovery unit 310 checks the timing error of the baseband signal outputted from the first complex multiplier 291 to restore the symbol timing. Of course, although the symbol timing is restored by the symbol timing recovery unit 310, the output signal of the re-sampler 311 still holds the frequency offset as illustrated in FIG. 9d. The baseband signal whose frequency offset is not corrected corresponds to the passband signal, such that the frequency band of the signal that has passed the re-sampler 311 can be precisely matched to the predetermined 5.38 MHz only by using the timing error detection unit 313. The baseband signal outputted via the re-sampler 313 is provided to the matched filter 330 to be removed of the aliasing included in the signal spectrum and then inputted to the down-sampler 350 (S5).

The down-sampler 350 down-samples the baseband complex signal outputted from the matched filter 330 by a same frequency as the symbol frequency and outputs the baseband signal having the spectrum as in FIG. 9c to the DC remover 370 and the OQAM signal generator 293 of the carrier wave recovery unit 290 (S6).

Successively, the OQAM signal generator 293 receives a complex signal having a spectrum as in FIG. 9e through the complex multiplier 293-1 and a sine wave whose central frequency is ¼ the symbol frequency and multiplies (S7). If there is a frequency offset, the output signal of the complex multiplier 293-1 is such that the central frequency of the signal spectrum as in FIG. 9f does not exactly accord with the zero frequency point (f=0), but is a bit lopsided as much as the frequency offset.

Although the OQAM signal generator 293 is indicated as a complex multiplier having as inputs the output complex signal of the down-sampler 350 and the complex sine wave as inputs, the OQAM signal generator 293 may be actually and simply embodied without recourse to the complex multiplier 293-1 as the central frequency of the inputted complex sine wave is ¼ the symbol frequency.

In other words, if n is 0, 1, 2, 3, ..., in the inputted complex sine wave ($e^{-j(n/2)\pi}$), the complex sine wave will repeatedly have values of $1(e^{-j\cdot 0}=1)$, $-j(e^{-j(\pi/2)}=\cos(\pi/2)-j\sin(\pi/2)=-j)$, $-1(e^{-j\cdot\pi}=\cos\pi-j\sin\pi=-1)$, $j(e^{-j\cdot(3/2)\pi}=j)$, ..., such that the OQAM signal generator 293 may be simply embodied by a code transform of the input signal.

If the real and imaginary components are split from the output complex signal from the OQAM signal generator 293 to be inputted to the phase error calculation unit 242-3, the phase error value of frequency offset may be obtained using the phase error calculation unit 295 that employs the OQAM method without recourse to the pilot signal (S8).

The first tan h calculator 295-1 of the phase error detection unit 295 calculates a tan h {I (k)} value by input of the real component signal {I (k)} and the calculated tan h {I (k)} is outputted, and the first delayer 295-2 is delayed by receiving the real component I (k) signal to generate I (k−½) signal. The second delayer 242-3 is delayed by receiving the imaginary signal {Q (k)} to generate a delayed Q (k−½) signal, and the second tan h calculator 295-4 receives the Q (k−½) signal to calculates tan h {Q (k−½)} and outputs.

The first multiplier 295-5 outputs tan h {I (k)*Q (k)} value from the first tan h calculator 295-1 and the imaginary component signal, and the second multiplier 295-6 calculates tan h {Q (k−½)*I (k−½)} value from outputs of the second tan h calculator 295-4 and the first delayer 295-2 and outputs.

Lastly, when an output signal from the second multiplier 295-6 passes through the adder 295-7, tan h {I (k)*Q(k)}−tan h {Q (k−½)*I (k−½)} value may be obtained, which is the phase error value obtained by the OQAM method. The FPLL system of the carrier wave recovery unit 290 corrects the frequency offset by allowing the phase error value thus obtained to be converged to zero.

Meanwhile, the complex signal inputted to the OQAM signal generator 293 is inputted in the same frequency (10.76 Mhz) as the symbol frequency, and if the complex signal inputted to the phase error detection unit 295 is transformed to an OQAM signal, a symbol interval of the transformed OQAM signal is lengthened two-fold by the first and second delayers 295-2, 295-3 whereas the sampling frequency is the same but the symbol period is lengthened. Based on the OQAM signal outputted from the OQAM signal generator 293, it is twice over-sampled. In other words, 1 $f_{S,VSB}$=10.76 MHz=2 $f_{S,OQAM}$.

Therefore, because the first and second delayers 295-2, 295-3 are delayed as much as one clock based on 1 $f_{S,VSB}$, the first and second delayers 295-2, 295-3 are delayed ½ symbol based on the OQAM signal.

Because the phase error detection unit 295 is operated in a two-fold over-sampled time domain, the rear end second down-sampler 297 extracts only the symbol unit baseband phase error value out of the phase error values by the sampling frequency of ½ fs (i.e., 5.38 MHz).

The second down-sampler 297 extracts by ½ f sampling frequency the phase error value corresponding to the frequency offset outputted from the phase error detection unit 295 and outputs to the up-sampler 299 (S9). The up-sampler 299 samples by the clock speed (35 MHz) at the first complex multiplier 291 side the baseband phase error inputted at the $f_{S,OQAM}$(5.38 MHz) speed in order to match the operational frequency with the portion compensating the baseband phase (S10).

The baseband phase error signal matched to the operational speed by passing through the up-sampler 299 is lowpass-filtered by the loop filter, and if the output signal (Δfp) of the loop filter is added up by the predetermined pilot frequency fp (i.e., fp=fc−2.69 MHz), the estimated carrier wave frequency offset $f_{p,est}$ ($f_{p,est}$=fp+Δfp) can be obtained (S11).

The NCO 305 receives the DC signal of $f_{p,est}$ to generate a complex sine wave having the $f_{p,est}$ frequency and outputs to the first complex multiplier 291 (S12), where the first complex multiplier 291 multiplies the complex conjugate of the generated complex sine wave by the complex signal outputted from the phase splitter 170 to correct the frequency offset of the outputted complex signal. If it is assumed that the carrier wave recovery unit 290 has accurately corrected the phase error of frequency offset, the output signal of the first complex multiplier 291 is such that the pilot signal is positioned at a zero frequency point (f=0) as illustrated in FIG. 9g and precisely converted to the baseband signal (S13).

Successively, the output signal passes through the DC remover 370 for removing the inserted pilot signal in order to facilitate the restoration of the carrier wave, and is inputted to the channel equalizer for removing the ISI.

FIG. 11 is just an exemplary implementation of OQAM method applied to VSB, and may be varied in various shapes. For example, although the output of the down-sampler 350 located at the rear end of the matched filter 330 was used in FIG. 11 as an input of the OQAM signal generator 293, the position thereof may be changed to an output terminal of the matched filter 330, an output terminal of the re-sampler 311 or an output terminal of the DC remover 270.

If the output of the matched filter 330 or the re-sampler 311 is used as an input of the OQAM signal generator 293, the complexity of the OQAM signal generator 293 is further increased because the central frequency of the input complex sine wave of the OQAM signal generator 293 must be ⅛ of the operational frequency.

The phase error detection unit 295 in FIG. 11 is just an example of approximation of the phase error detection unit 295 applicable to the VSB system and may be changed to various modifications. For example, the tan h (I) calculated by the tan h function may be approximated by sign (I), I, or multi-level slicer. In the same context, the tan h (Q) may be approximated by sign (Q), Q or multi-level slicer.

Figure 14:
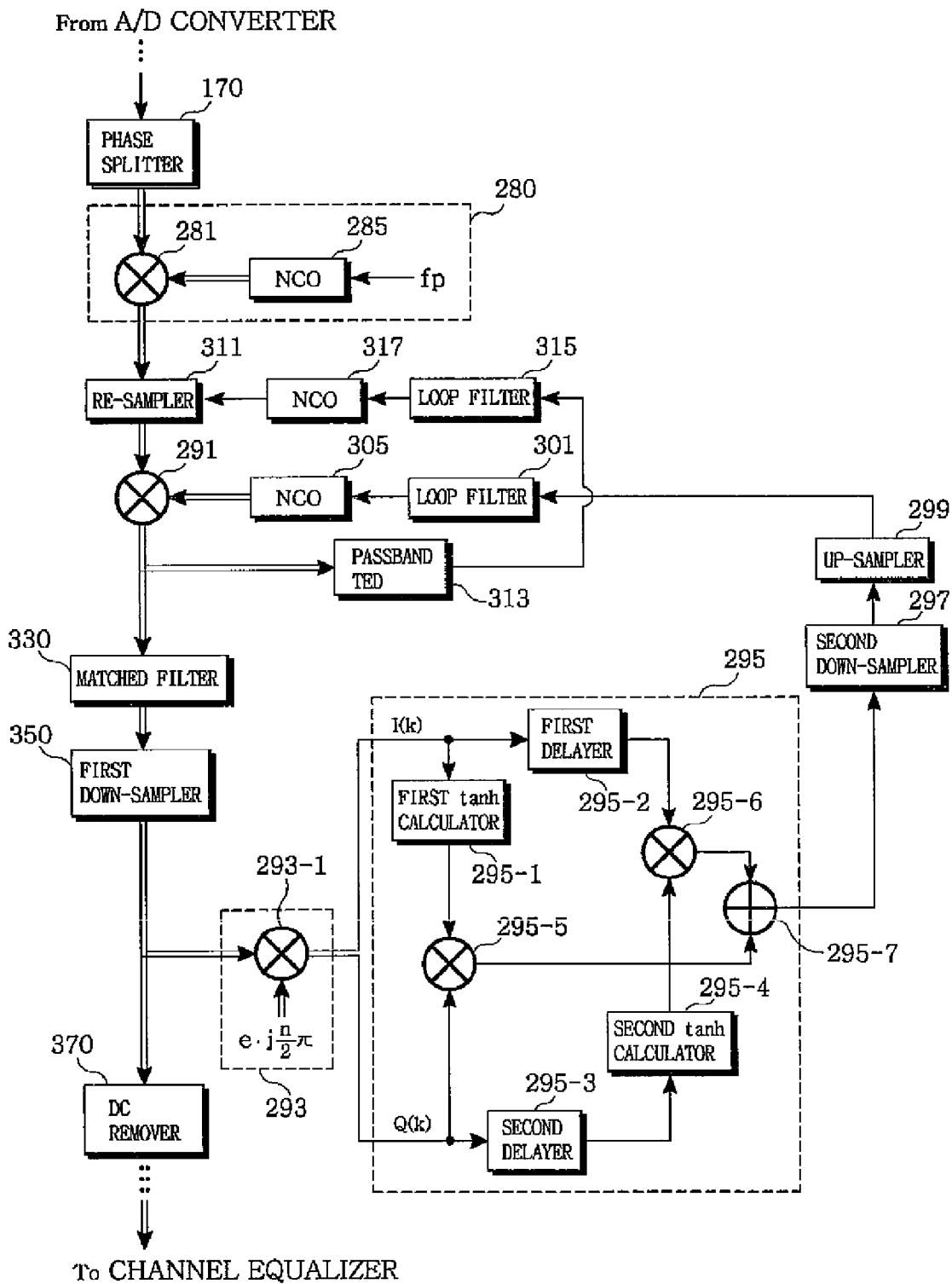
FIG. 14 shows another exemplary implementation of a construction of a carrier wave recovery unit and a symbol timing recovery unit.

The position for compensating the carrier wave frequency or the phase offset may be also varied. For example, the position for correcting the carrier wave offset may be an input terminal or an output terminal of the re-sampler 311. FIG. 14 illustrates a case where the carrier wave offset is compensated by the output terminal of the re-sampler 311.

If the carrier wave offset is compensated by the output terminal of the re-sampler 311, the down-converter 280 for transforming the digital passband signal to near baseband signal using the fixed frequency ($f_p$) must precede as shown in FIG. 14 in order not to bring forth the performance degradation of the re-sampler 311. Because the near baseband converted by the down-sampler 280 has been down-converted by the fixed frequency, there still remains the carrier wave offset, so in order to operate the symbol timing recovery unit 310 in a stable condition, the passband timing error recovery unit 313 must be used as shown in FIG. 12.

In other words, the carrier wave recovery system must comprise a phase splitter 170, a down-converter 280, symbol timing recovery units (310; 311~317), a matched filter 330, a down-sampler 350 and carrier wave recovery units (290; 291~305).

The phase splitter 170 receives digitalized passband signal and converts to complex signals (I signal, Q signal) and outputs the converted complex signals. The down-converter 280 receives the digitalized passband signal outputted from the phase splitter 170 and the conjugate complex value relative to the complex sine wave of the fixed frequency outputted from the NCO 285, and multiplies via the complex multiplier 281 to convert the digital passband signal to the baseband signal.

The symbol timing recovery units (310; 311~317) sample the complex signal outputted from the down-converter 280 twice the symbol frequency, analyze the sampled signal to detect a timing error, adjust the sampling time in response to the timing error and synchronize the symbol frequency and timing.

The matched filter 330 removes the aliasing of the baseband complex signal outputted by the symbol timing recovery unit 310 and outputs, and the down-sampler 330 samples the complex signal outputted by the matched filter 330 by the same frequency as the symbol frequency and outputs.

The carrier wave recovery units (290; 291~305) receive the complex signal outputted from the down-sampler 350 and multiply the complex signal by the complex sine wave whose central frequency is ¼ the symbol frequency to generate a real and imaginary component OQAM signals, calculate the phase error value from the real and imaginary component OQAM signal, generate a complex sine wave for compensating the calculated phase error value, and multiple the complex sine wave by the complex signal outputted by the symbol timing recovery unit 310 to correct the frequency offset of the complex signal.

Furthermore, the carrier wave recovery unit 290 comprises: an OQAM signal generator 293 multiplying the complex signal outputted from the down-sampler 350 by a complex sine wave whose central frequency is ¼ the symbol frequency that is provided from outside to split the complex signal to a real component and an imaginary component and outputting the split complex signal; a phase error detection unit 295 calculating a phase error value from the real and imaginary component OQAM signals outputted from the OQAM signal generator and outputting; a second down-sampler 297 extracting a phase error value that is equal to the frequency offset outputted from the phase error detection unit 295 using a ½ fs sampling frequency (i.e., 5.38 MHz); an up-sampler 299 sampling by a clock speed (i.e., 21.52 MHz) at the symbol timing recovery unit 310 side a baseband phase error inputted from the second down-sampler 297 with a symbol frequency speed in order to match an operational frequency with a portion compensating a baseband phase; a loop filter 301 lowpass-filtering a baseband phase error outputted from the up-sampler 299; a numerically controlled oscillator (NCO. 305) receiving a direct current (DC) signal relative to the phase error from the loop filter to generate a complex sine wave having a frequency of an estimated carrier wave frequency offset; and a complex multiplier 291 disposed between the matched filter 330 and the symbol timing recovery unit 310 for multiplying a conjugate complex value of the complex sine wave outputted from the NCO 305 by a complex signal outputted from the phase splitter 170 to correct the frequency offset and then to correct the frequency offset by the complex signal outputted from the symbol timing recovery unit 310.

The output signal of the re-sampler 311 is inputted to the complex multiplier 291 for correcting the carrier wave frequency offset to correct the carrier wave offset. The symbol timing error is extracted from the signal whose carrier wave offset is corrected via the complex multiplier 291 to operate the symbol timing recovery unit 310.

The structure has the same operation as that of the carrier wave recovery unit of FIG. 11, and a circuit having the same function as that of FIG. 11 is indicated with like reference numerals, so that there will be no more detailed explanation on the operation thereof.

As apparent from foregoing, there is an advantage in the apparatus for recovering carrier wave in digital broadcasting receiver and method therefor according to the instant novel concept in that the frequency offset of the carrier wave can be corrected with excellent carrier wave restoration performance using the baseband complex signal without recourse to a pilot signal, thereby improving the performance of the digital broadcasting receiver under the frequency-selective fading channel environment.

Exemplary implementations as described herein are illustrative of the general inventive concept, and should not to be construed as limiting thereof. Although the exemplary implementations of the general novel concept have been described, those skilled in the art will readily appreciate that many modifications are possible in the exemplary implementations without materially departing from the novel teachings and advantages of the general inventive concept. Accordingly, all such modifications are intended to be included within the scope of the present novel concept as defined in the claims. Therefore, the foregoing is illustrative of exemplary implementations of the general novel concept and is not to be construed as limited to the specific exemplary implementations disclosed herein, and that modifications to the disclosed exemplary implementations, as well as other exemplary implementations, are intended to be included within the scope of the appended claims. The general inventive concept is defined by the following claims, with equivalents of the claims to be included therein.

What is claimed is:

1. An apparatus for recovering a carrier wave in a digital broadcasting receiver, comprising:
    a phase splitter configured to split a digitalized passband signal to mutually phase-different real and imaginary component passband complex signals;
    a down-converter configured to
        multiply the digitalized passband complex signals inputted from the phase splitter by a conjugate complex value relative to a complex sine wave of a fixed frequency inputted from a predetermined numerically controlled oscillator (NCO), and
        convert to a near baseband complex signal; and
    a carrier wave recovery unit configured to
        detect phase errors of the baseband complex signal via a plurality of phase error detection units having mutually different phase error detection characteristics,
        accumulate the detected phase errors to estimate a frequency error relative to the plurality of phase error detection units, and
        apply a complex sine wave to compensate the estimated frequency error to correct the frequency offset of the complex signal,
    wherein the plurality of phase error detection units in the carrier wave recovery unit comprises:
        a first phase error detection unit configured to extract a pilot signal of the complex signal and detect a phase error of the extracted pilot signal; and
        a second phase error detection unit configured to detect a phase error using a complex signal shape.

2. The apparatus as claimed in claim 1, further comprising:
    a symbol timing recovery unit disposed between the down converter and the carrier wave recovery unit and configured to
        sample the near baseband complex signal inputted from the down-converter twice a symbol frequency to detect a timing error, and
        adjust a sampling time in response to the detected timing error to restore the symbol timing.

3. The apparatus as claimed in claim 1, wherein the carrier wave recovery unit comprises:
    first and second complex multipliers, each multiplier configured to multiply a baseband complex signal by a complex sine wave corresponding to a frequency error to correct a frequency offset relative to the baseband complex signal;
    a frequency sharing loop filter configured to
        accumulate the phase error values inputted from the first and second phase error detection units to estimate a frequency error, and
        convert the phase errors to frequency errors by sharing the estimated frequency errors and adding the phase error; and
    a controller configured to monitor the complex signals inputted from the first and second complex multipliers to differentially control a sharing contribution relative to the phase errors of the first and second phase error detection units inputted from the frequency sharing loop filter.

4. The apparatus as claimed in claim 3, wherein the first phase error detection unit comprises:
    a lowpass filter configured to extract a pilot signal from the complex signal;
    a delayer configured to delay a real component pilot signal inputted from the lowpass filter; and
    a multiplier configured to multiply a real component signal inputted from the delayer by an imaginary component signal inputted from the lowpass filter to detect a phase error.

5. The apparatus as claimed in claim 3, wherein the second phase error detection unit comprises:
    a down sampler configured to sample the baseband complex signal inputted from the second complex multiplier by a frequency having the same frequency as the symbol frequency;
    an Offset Quadrature Amplitude Modulation (OQAM) signal generator configured to multiply the complex signal inputted from the down-sampler by an outside-inputted complex sine wave whose central frequency is 1/n the symbol frequency to split the complex signal to real component and imaginary component OQAM signals; and
    a phase error calculation unit configured to calculate a phase error from the real and imaginary component OQAM signals inputted from the OQAM signal generator.

6. The apparatus as claimed in claim 5, wherein the 1/n complex sine wave in the OQAM signal generator is a fixed oscillation signal whose central frequency is ¼ the symbol frequency.

7. The apparatus as claimed in claim 5, wherein the phase error calculation unit is configured to calculate the real component $\{I(k)\}$ and imaginary component $\{Q(k)\}$ OQAM signals inputted from the OQAM signal generator to output a phase error of tanh$\{I(k)*Q(k)\}$−tanh$\{Q(k-½)*I(k-½)\}$.

8. The apparatus as claimed in claim 5, wherein the second phase error detection unit further comprises:
    a second down-sampler configured to extract the phase error corresponding to the frequency offset inputted from the phase error calculation unit by half the frequency of the sampling frequency; and
    an up-sampler configured to sample with an increased clock speed the phase error inputted from the second down-sampler in order to match an operational frequency with a portion compensating a baseband phase.

9. The apparatus as claimed in claim 3, wherein the frequency sharing loop filter comprises:

a first Kp multiplier configured to multiply the phase error inputted from the first phase error detection unit by a proportional gain control signal inputted from the controller;

a second Kp multiplier configured to multiply a phase error of the second phase error detection unit by the proportional gain control signal inputted from the controller;

a first Ki multiplier configured to multiply the phase error inputted from the first phase error detection unit by an accumulated gain control signal outputted from the controller;

a second Ki multiplier configured to multiply a phase error inputted from the second phase error detection unit by an accumulated gain control signal inputted from the controller;

an accumulator configured to accumulate the phase errors inputted from the first and second Ki multipliers to calculate a frequency error;

a first adder configured to add up the phase error inputted from the first Kp multiplier to the inputted frequency errors to convert the phase errors to a frequency error; and a second adder configured to add up the phase error inputted from the second Kp multiplier to the frequency error inputted from the accumulator to convert the phase error to a frequency error value.

10. The apparatus as claimed in claim 3, wherein the frequency sharing loop filter comprises:

a first Kp multiplier configured to multiply the phase error inputted from the first phase error detection unit by a proportional gain control signal inputted from the controller;

a second Kp multiplier configured to multiply a phase error of the second phase error detection unit by the proportional gain control signal inputted from the controller;

a first accumulator configured to accumulate the phase errors inputted from the first phase error detection unit to calculate a carrier wave frequency error;

a second accumulator configured to accumulate the phase errors inputted from the second phase error detection unit to calculate a carrier wave frequency error;

a first Ki multiplier configured to multiply the phase errors inputted from the first accumulator by the accumulated gain control signal inputted from the controller;

a second Ki multiplier configured to multiply the phase errors inputted from the second accumulator by the accumulated gain control signal inputted from the controller;

an adder configured to add up the frequency errors inputted from the first and second Ki multipliers;

a first adder configured to add up the phase errors inputted from the first Kp multiplier to the frequency errors inputted from the adder to convert the phase errors to frequency errors; and a second adder configured to add up the phase errors inputted from the second Kp multiplier to the frequency errors inputted from the adder to convert the phase errors to frequency errors.

11. The apparatus as claimed in claim 2, wherein the symbol timing recovery unit comprises:

a re-sampler configured to sample the baseband complex signal inputted from the down converter by a clock frequency twice the predetermined symbol frequency;

a passband timing error detection unit configured to extract an upper sideband signal from the signal spectrum inputted from the re-sampler to monitor a zero crossing status of the extracted signal to detect a timing synchronization error;

a loop filter configured to perform a lowpass filtering of the timing error signal inputted from the passband timing error detection unit; and a numerically controlled oscillator (NCO) configured to generate a sampling clock whose timing error is compensated and supply the sampling clock to the re-sampler.

12. An apparatus for recovering a carrier wave in a digital broadcasting receiver, comprising:

a phase splitter configured to split a digitalized passband signal to mutually phase-different real and imaginary component passband complex signals;

a carrier wave recovery unit configured to multiply the complex signal inputted from the down sampler by a complex sine wave whose central frequency is 1/n the symbol frequency to generate real and imaginary component Offset Quadrature Amplitude Modulation (OQAM) signals, calculate a phase error from the generated OQAM signals, and generate a complex sine wave to compensate the calculated phase errors to correct the complex signal frequency offset outputted from the phase splitter; and a symbol timing recovery unit disposed between the down sampler and the phase splitter and configured to sample the complex signal inputted from the phase splitter twice the symbol frequency to detect a timing error, and adjust a sampling time in response to the detected timing error to restore the symbol timing, wherein the symbol timing recovery unit comprises:

a re-sampler configured to sample the baseband complex signal inputted from the carrier wave recovery unit by a clock frequency twice the predetermined symbol frequency;

a passband timing error detection unit configured to extract an upper sideband signal from the signal spectrum inputted from the re-sampler to monitor a zero crossing status of the extracted signal to detect a timing synchronization error;

a loop filter configured to perform a lowpass filtering of the timing error signal inputted from the passband timing error detection unit; and a numerically controlled oscillator (NCO) configured to generate a sampling clock whose timing error is compensated and supply the sampling clock to the re-sampler.

13. The apparatus as claimed in claim 12, further comprising:

a matched filter disposed between the symbol timing recovery unit and the down-sampler and configured to remove an aliasing of the complex signal inputted from the symbol timing recovery unit.

14. The apparatus as claimed in claim 12, wherein the 1/n complex sine wave in the OQAM signal generator is a fixed oscillation signal whose central frequency is ¼ the symbol frequency.

15. The apparatus as claimed in claim 12, wherein the carrier wave recovery unit comprises:

an Offset Quadrature Amplitude Modulation (OQAM) signal generator configured to multiply the complex signal inputted from the down-sampler by an outside-inputted complex sine wave whose central frequency is 1/n the symbol frequency to split the complex signal to real component and imaginary component OQAM signals;
a phase error detection unit configured to detect a phase error from the real component and imaginary component OQAM signals inputted from the OQAM signal generator; and
a complex multiplier disposed between the phase splitter and the symbol timing recovery unit and configured to multiply the complex signal inputted from the phase splitter by a conjugate complex value of a complex sine wave corresponding to the detected phase error to correct the frequency offset of the complex signal inputted from the phase splitter.

16. The apparatus as claimed in claim 15, wherein the phase error detection unit is configured to calculate the real component $\{I(k)\}$ and imaginary component $\{Q(k)\}$ OQAM signals inputted from the OQAM signal generator to output a phase error of $\tan h \{I(k)*Q(k)\} - \tan h\{Q(k-\frac{1}{2})*I(k-\frac{1}{2})\}$.

17. The apparatus as claimed in claim 15, wherein the carrier wave recovery unit comprises:
 a second down-sampler configured to extract a phase error corresponding to the frequency offset inputted from the phase error detection unit using a frequency ½ the sampling frequency;
 an up-sampler configured to sample with an increased clock speed a baseband phase error inputted from the second down-sampler in order to match an operational frequency with a portion compensating a baseband phase;
 a loop filter configured to lowpass filter a baseband phase error inputted from the up-sampler;
 an adder configured to add up the signal inputted from the loop filter to a predetermined pilot signal; and
 a numerically controlled oscillator (NCO) configured to receive a direct current signal relative to the frequency offset from the adder to generate a complex sine wave having the same frequency as the frequency offset.

18. An apparatus for recovering a carrier wave in a digital broadcasting receiver, comprising:
 a phase splitter configured to split a digitalized passband signal to mutually phase-different real and imaginary component passband complex signals;
 a down converter configured to convert the digitalized passband signal inputted from the phase splitter to a baseband signal;
 a symbol timing recovery unit configured to
  sample the complex signal inputted from the down converter at twice the symbol frequency to detect a timing error and
  adjust a sampling time in response to the detected timing error to restore the symbol timing;
 a down sampler configured to sample the complex signal inputted from the symbol timing recovery unit by a frequency having the same frequency as the symbol frequency;
 an Offset Quadrature Amplitude Modulation (OQAM) signal generator configured to
  multiply the complex signal inputted from the downsampler by a complex sine wave whose central frequency is ¼ the symbol frequency to split the complex signal to real component and imaginary component OQAM signals,
  calculate a phase error from the generated OQAM signals to generate a complex sine wave compensating the calculated phase error, and
  compensate the frequency offset of the complex signal outputted from the phase splitter;
 a phase error detection unit configured to detect the phase error from the real component and imaginary component OQAM signals inputted from the OQAM signal generator; and
 a complex multiplier disposed between a matched filter and the symbol timing recovery unit and configured to multiply the complex signal inputted from the phase splitter by a conjugate complex value of a complex sine wave corresponding to the detected phase error to correct the complex signal frequency offset.

19. The apparatus as claimed in claim 18, further comprising:
 the matched filter, the matched filter being disposed between the symbol timing recovery unit and the downsampler, the matched filter configured to remove an aliasing of the baseband complex signal inputted from the symbol timing recovery unit.

20. The apparatus as claimed in claim 18, wherein the carrier wave recovery unit comprises:
 a second down-sampler configured to extract a phase error corresponding to the frequency offset inputted from the phase error detection unit using a frequency ½ the sampling frequency;
 an up-sampler configured to sample with an increased clock speed a baseband phase error inputted from the second down-sampler in order to match an operational frequency with a portion compensating a baseband phase;
 a loop filter configured to lowpass filter a baseband phase error inputted from the up-sampler; and
 a numerically controlled oscillator (NCO) configured to
  receive from the loop filter a direct current signal relative to the phase error to generate a complex sine wave having the same frequency as the frequency offset, and
  output to the complex multiplier.

21. A method for recovering a carrier wave in a digital broadcasting receiver, comprising:
 converting a digitally converted passband complex signal to a baseband complex signal;
 sampling the complex signal converted to the baseband complex signal by a frequency having the same frequency as the symbol frequency;
 multiplying the complex signal sampled in the same frequency as the symbol frequency by a complex sine signal 1/n the frequency of the symbol frequency to generate real and imaginary component Offset Quadrature Amplitude Modulation (OQAM) complex signals;
 estimating a frequency offset relative to the detected phase error by detecting a phase error of the generated OQAM signals; and
 correcting the frequency offset of the baseband complex signal by generating a complex sine wave corresponding to the estimated frequency offset,
 wherein the step of estimating the frequency offset comprises:
  detecting a phase error from the OQAM complex signal;
  extracting the detected phase error by a frequency ½ the sampling frequency;
  sampling with an increased clock speed the extracted phase error in order to match an operational frequency with a portion compensating a baseband phase; and
  lowpass-filtering the up-sampled phase error to output a direct current signal having the estimated frequency offset.

22. The method as claimed in claim 21, wherein the baseband complex signal is a signal in which a timing error of the symbol frequency is recovered.

23. The method as claimed in claim 21, wherein the 1/n complex sine wave is a fixed oscillation signal whose central frequency is ¼ the symbol frequency in the generation of the OQAM complex signal.

24. The method as claimed in claim 21, wherein the step of correcting the frequency offset comprises:

receiving a direct current signal having the estimated frequency offset to generate a complex sine wave having a same frequency as the frequency offset; and multiplying the conjugate complex value of the generated complex sine wave by the baseband complex signal to correct the frequency offset.

* * * * *